United States Patent
Yoshida et al.

(10) Patent No.: US 6,561,158 B2
(45) Date of Patent: May 13, 2003

(54) ENHANCED ENGINE RESPONSE TO TORQUE DEMAND DURING COLD-START AND CATALYST WARM-UP

(75) Inventors: Iwao Yoshida, Yokohama (JP); Takao Maitani, Kanagawa (JP)

(73) Assignee: Nissan Motor Co., LTD, Yokohama (JP)

( * ) Notice: Subject to any disclaimer, the term of this patent is extended or adjusted under 35 U.S.C. 154(b) by 0 days.

(21) Appl. No.: 09/982,097

(22) Filed: Oct. 19, 2001

(65) Prior Publication Data
US 2002/0050265 A1 May 2, 2002

(30) Foreign Application Priority Data

Oct. 20, 2000 (JP) ........................................ 2000-321809
Dec. 20, 2000 (JP) ........................................ 2000-387847

(51) Int. Cl.[7] ................................................ F02B 17/00
(52) U.S. Cl. .................. 123/295; 123/305; 123/406.52
(58) Field of Search ................................ 123/295, 299, 123/305, 406.52

(56) References Cited

U.S. PATENT DOCUMENTS

| 5,207,058 | A | | 5/1993 | Sasaki et al. ............... 60/284 |
| 5,482,017 | A | | 1/1996 | Brehob et al. .............. 123/299 |
| 5,553,590 | A | * | 9/1996 | Suzuki et al. ........... 123/406.52 |
| 6,044,642 | A | | 4/2000 | Nishimura et al. ........... 60/285 |
| 6,237,562 | B1 | * | 5/2001 | Awasaka et al. ............ 123/305 |

FOREIGN PATENT DOCUMENTS

| EP | 0 943 793 | 9/1999 |
| JP | 10-212987 | 8/1998 |
| JP | 11-101147 | 4/1999 |
| JP | 11-324765 | 11/1999 |
| JP | 2001-73912 | 3/2001 |
| JP | 2001-73913 | 3/2001 |
| JP | 2001-82211 | 3/2001 |
| JP | 2001-82220 | 3/2001 |

OTHER PUBLICATIONS

U.S. patent application Ser. No. 09/649,995, Tomita et al., filed Aug. 29, 2000.
U.S. patent application Ser. No. 09/271,205, Tomita et al.

* cited by examiner

Primary Examiner—Erick Solis
(74) Attorney, Agent, or Firm—Foley & Lardner

(57) ABSTRACT

A spark ignited internal combustion engine employs fuel injectors positioned to inject fuel directly into combustion chambers of the engine, and an electronic engine controller (EEC) to control operation of the engine. The EEC implements a routine which controls the quantity of fuel injected, and spark timing by varying a period of time, which is required for advancing the spark timing during switch from a stratified stoichiometric charge combustion by split injection to a homogeneous charge combustion by single injection, with differing degrees of operator torque demand.

20 Claims, 30 Drawing Sheets

INTAKE STROKE

COMPRESSION STROKE

FIG.2C
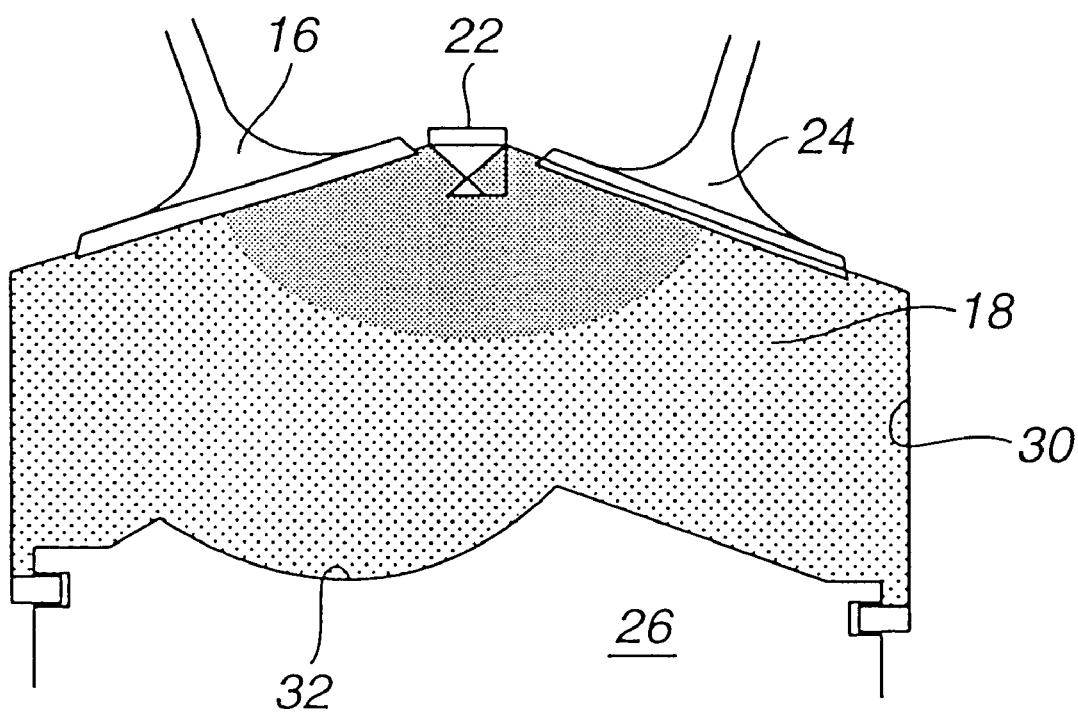
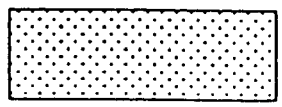 LEAN MIXTURE
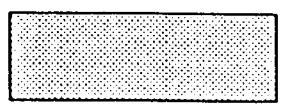 RICH MIXTURE

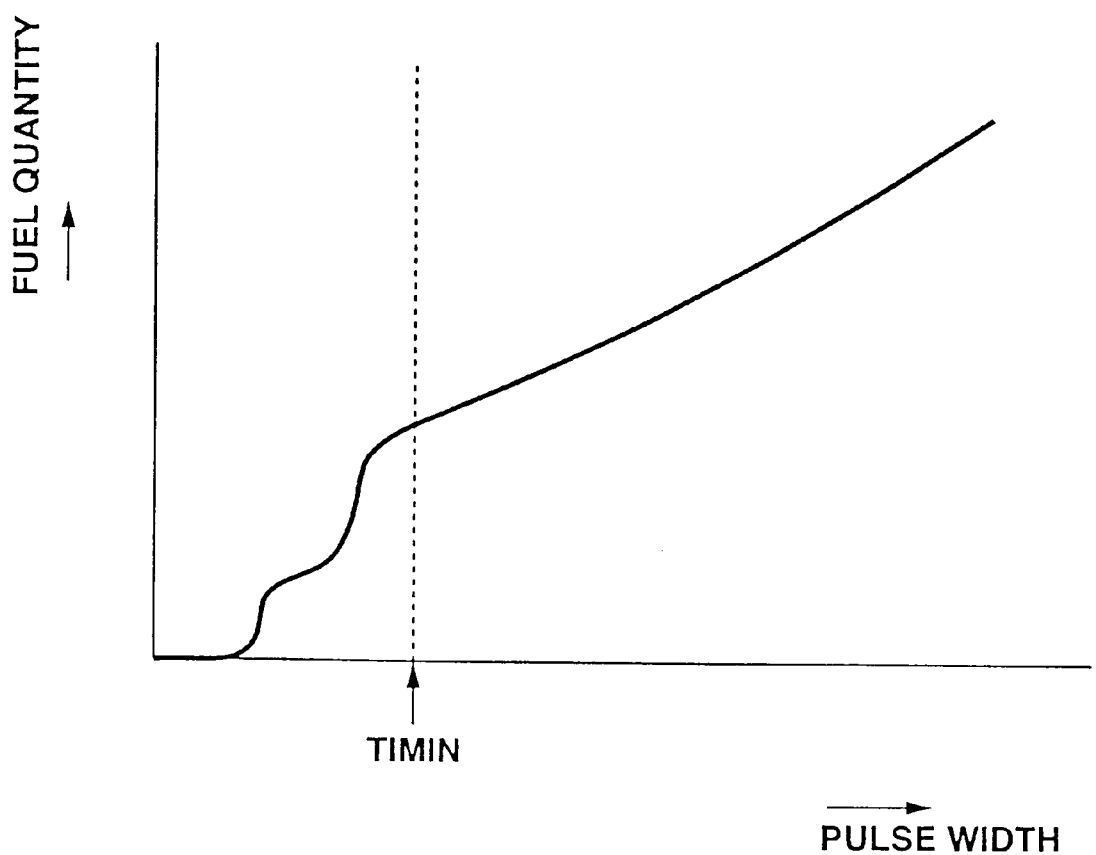

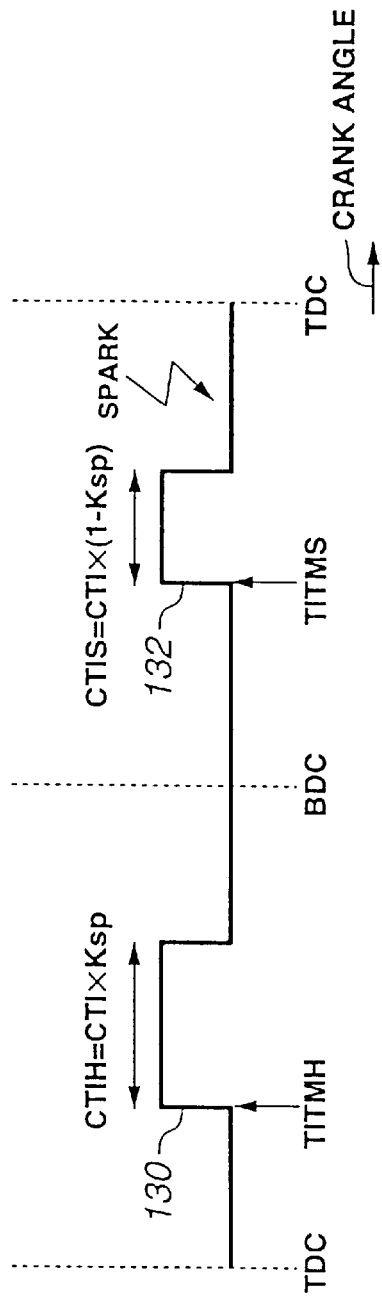
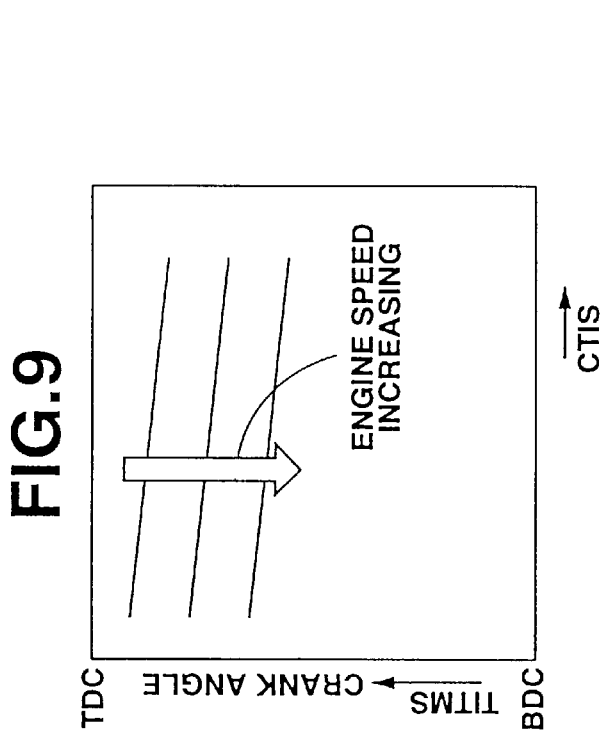
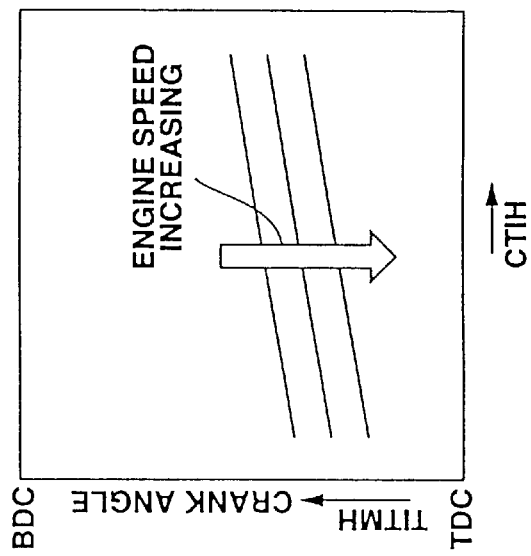
FIG. 7
FIG. 8
FIG. 9

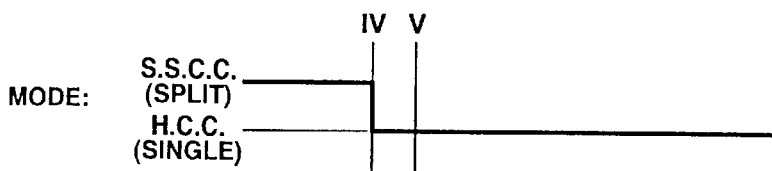
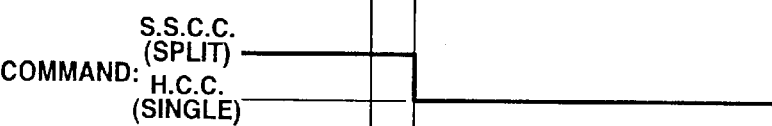
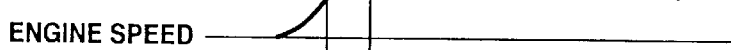
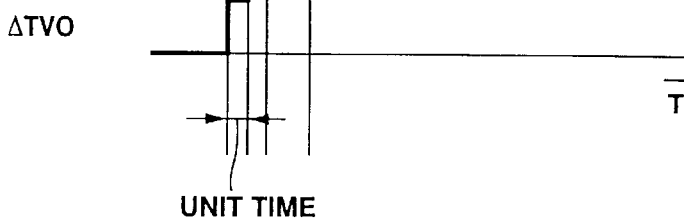

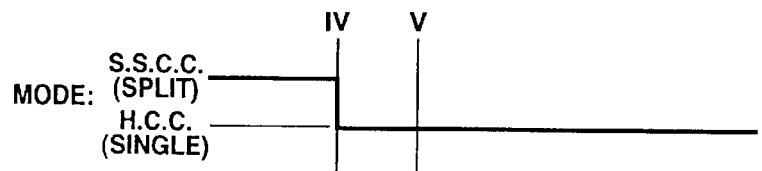
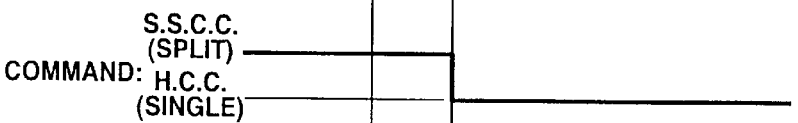
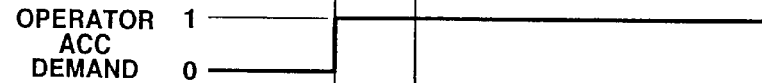
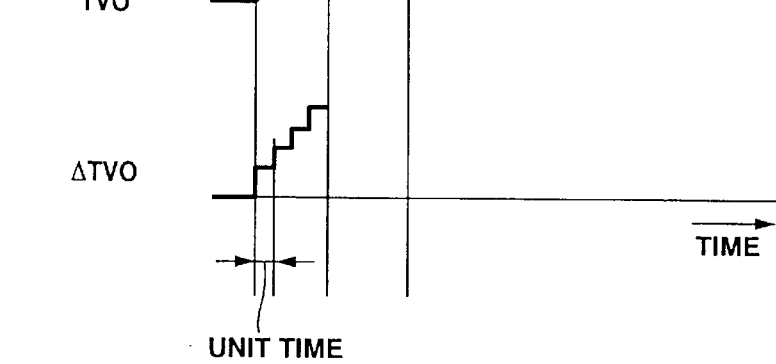

ENHANCED ENGINE RESPONSE TO TORQUE DEMAND DURING COLD-START AND CATALYST WARM-UP

BACKGROUND OF THE INVENTION

1. Field of the Invention

The present invention relates to a transient control of a spark ignited internal combustion engine during a switch between different combustion types.

2. Acronyms

The written description provided herein contains acronyms, which refer, for example, to combustion types, which may be selectively employed by a spark ignited internal combustion engine. For purposes of the written description herein, acronyms will be defined as follows:

Stratified Stoichiometric Charge Combustion (S.S.C.C.); this is a combustion type wherein, within a cylinder charge created in each combustion chamber, a relatively rich air/fuel mixture portion is locally created around a spark plug within the surrounding or background relatively lean air/fuel mixture under a condition that the overall air/fuel ratio of the cylinder charge is kept within a limited narrow window around the stoichiometry, and the relatively rich air/fuel mixture is ignited by a spark:

Stratified Stoichiometric Charge Combustion by Split Injection [S.S.C.C. (SPLIT)]; this is the species of S.S.C.C., wherein a split injection is performed to create the stratification of the cylinder charge:

Stratified Lean Charge Combustion (S.L.C.C.); this is a combustion type wherein, within a cylinder charge, a relatively rich air/fuel mixture is locally created around a spark plug within the surrounding or background very lean air/fuel mixture under a condition that the overall air/fuel ratio of the cylinder charge is considerably greater than the stoichiometry, and the relatively rich air/fuel mixture is ignited by a spark:

Homogeneous Charge Combustion (H.C.C.); this is a combustion type wherein, within a cylinder, a homogeneous air/fuel mixture is created and ignited by a spark:

Homogeneous Stoichiometric Charge Combustion (H.S.C.C.); this is a combustion type wherein, within a cylinder, a homogeneous stoichiometric air/fuel mixture is created and ignited by a spark.

Homogeneous Charge Combustion by Single Injection [H.C.C. (SINGLE)]; this is the species of H.C.C., wherein a single injection is performed to create the homogeneous air/fuel mixture within a cylinder:

3. Description of Related Art

Recently, direct fuel injection is used to perform split injection for each engine cycle to achieve stratified charge for reduction of hydrocarbon emissions and catalyst warm-up time. For example, Nishijima et al. in U.S. Pat. No. 6,044,642 (=JP-A 10-212987) entitled "Direct Fuel Injection Device" describes an engine which utilizes direct fuel injection and which employs a control strategy to increase the temperature of catalyst converter if it is found to be lower than a predetermined temperature. According to the control strategy, split injection is performed to create, in each combustion chamber, rich or stoichiometry mixture around a spark plug within the surrounding lean mixture and the spark timing is retarded to increase the temperature of exhaust gas. Split injection consists of injecting a first quantity of fuel for each engine cycle during the intake stroke and injecting a second quantity of fuel later in the same engine cycle during the compression stroke.

Tomita et al. in EP 0 943 793 A2, entitled "Control for direct fuel injection spark ignition internal combustion engine" published Sep. 22, 1999 filed by the assignee of the present invention describes an internal combustion engine. The engine employs fuel injectors positioned to directly inject fuel into combustion chambers, and an electronic engine controller (EEC) to operate the engine. The EEC implements a cold start routine, which controls the quantity of fuel injected, the time at which the fuel is injected, and spark timing to achieve a rapid increase in temperature of the engine and the exhaust system components, including a catalytic converter, thereby decreasing hydrocarbon (HC) emissions during cold start. Tomita et al. employs a so-called "stratified stoichiometric charge combustion" (S.S.C.C.) by split injection for reduction of tailpipe hydrocarbon emissions and catalyst warm-up time. Upon completion of catalyst warm-up, a switch in combustion mode is made from S.S.C.C. to a so-called "homogeneous charge combustion" (H.C.C.).

Fuel injectors utilizing electronic control valves have become widespread. In operation, an energizing or excitation time for the control valve is determined corresponding to current engine conditions. The excitation of the control valve causes the lifting of the spray tip needle, which causes fuel injection to occur. Fuel quantity and pulse width hold linearity when the pulse width exceeds a minimum pulse width (TIMIN) as shown in FIG. 3. This linearity is broken when pulse width is less than the minimum pulse width so that precise control of lower fuel quantities is difficult to achieve. However, precise control over such lower fuel quantities is essential when split-injection is required for S.S.C.C.

SUMMARY OF THE INVENTION

In order to achieve precise control over lower fuel quantities unachievable with pulse width only, injection pressure may be reduced and pulse width may be increased. At such reduced injection pressure appropriate for split injection, increased fuel quantity may not be injected only by increasing pulse width, leading to a sluggish response to an increase in torque demand during acceleration or up-hill climbing of vehicle operation.

A spark timing control routine, which controls spark timing to provide smooth torque change, is described in copending U.S. patent application Ser. No. 09/649,995, filed Aug. 29, 2000, assigned to the assignee of the present invention. The spark timing control has proved to be effective in providing smooth change in engine torque at the expense of quick response to an increase in torque demand. As a result, a sluggish response to increased torque demand during acceleration or up-hill climbing of vehicle operation is unavoidable.

It is an object of the present invention to provide a quick response to an increase in torque demand when a spark ignited internal combustion engine operates on S.S.C.C. during operation to warm-up catalyst.

In accordance with a preferred embodiment of the present invention, the primary object of the present invention is solved by a method for enhanced response to operator torque demand in a spark ignited internal combustion engine. The engine has fuel injectors positioned to inject fuel directly into combustion chambers of the engine. The method comprises:

operating the engine on stratified stoichiometry charge combustion (S.S.C.C.), during a predetermined engine operation, by performing a split injection for each engine cycle, and controlling spark timing according to a first ignition timing point;

varying a period of time, which is required for advancing spark timing from the first ignition timing point to a second ignition timing point during switch from S.S.C.C. to H.C.C., with differing degrees of the operator torque demand; and operating the engine on H.C.C. by performing a single injection for each engine cycle after elapse of said period of time.

BRIEF DESCRIPTION OF THE DRAWINGS

The present invention will be more fully appreciated as the same becomes better understood from the following detailed description when considered in connection with the accompanying drawings, in which like reference numerals and characters designate like or corresponding parts through the several views.

FIG. 2C shows stratified charge within the combustion chamber around top dead center (TDC) during compression stroke of the same engine cycle.

FIG. 3 shows a fuel quantity (injected) vs., pulse width (of a fuel injection pulse) characteristic of a fuel injector.

FIG. 7 is a timing diagram illustrating pulses at discrete times during each engine cycle upon performing split injection.

FIG. 8 is a graph illustrating the varying of injection time (TITMH) versus pulse width (CTIH) contour lines with differing engine speeds.

FIG. 9 is a graph illustrating the varying of injection time (TITMS) versus pulse width (CTIS) contour lines with differing engine speeds.

FIGS. 14A to 14H are a timing diagram illustrating a method of the present invention of controlling spark ignited internal combustion in response to an increase in torque demand during engine operation on S.S.C.C. (SPLIT).

FIGS. 15A to 15H are a timing diagram illustrating the method of the present invention of controlling the engine in response to a less increase in torque demand during engine operation on S.S.C.C. (SPLIT).

DESCRIPTION OF THE PREFERRED EMBODIMENTS

Figure 1:
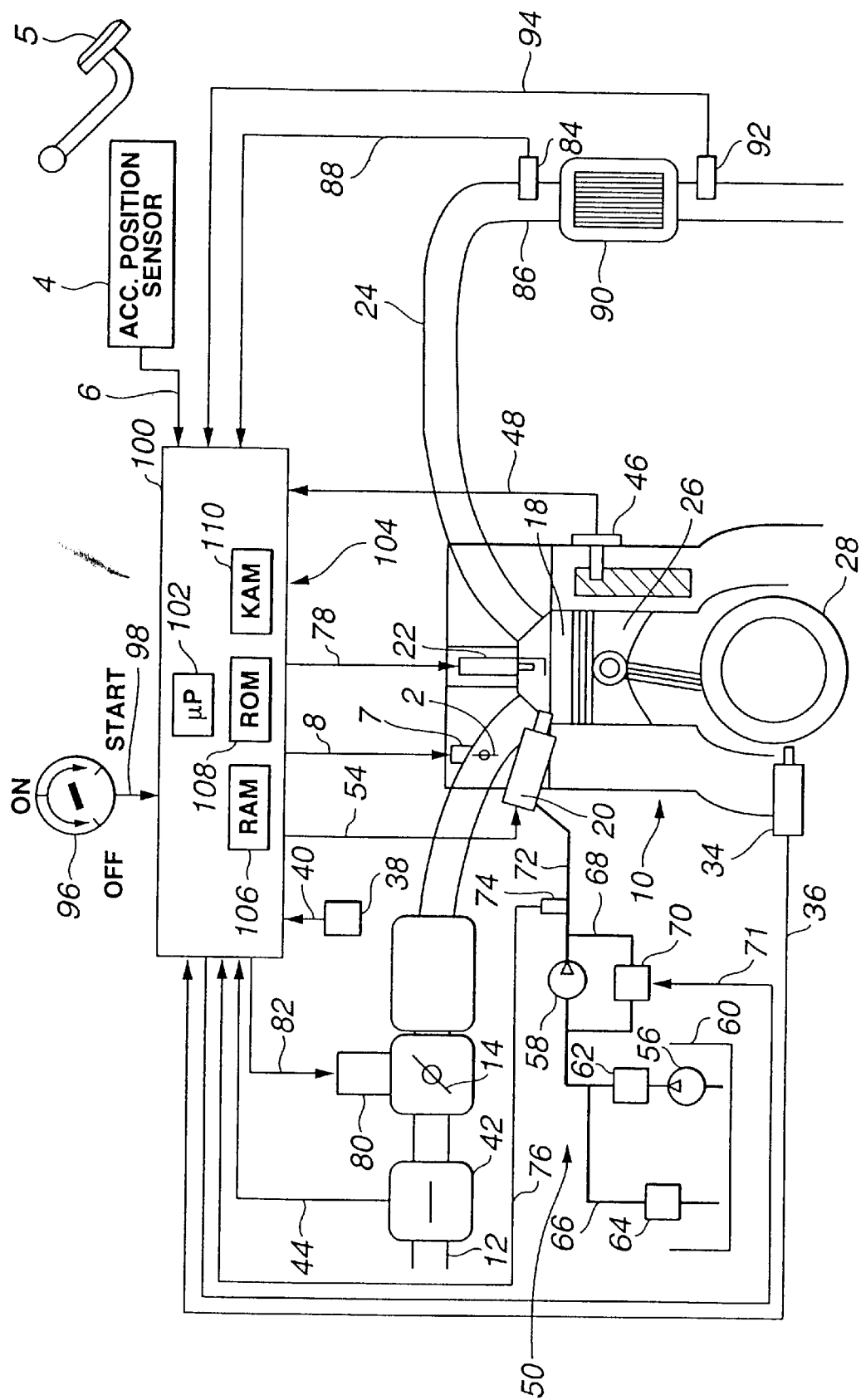
FIG. 1 is a schematic diagram of a spark ignited internal combustion engine system made in accordance with the present invention.
Figure 2A:
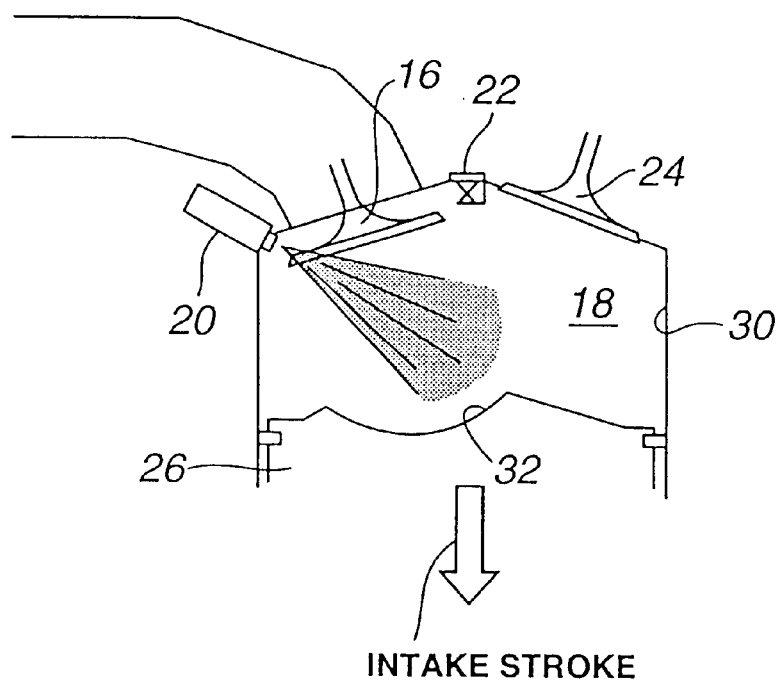
FIG. 2A shows a first injection of a first quantity of fuel into a combustion chamber during intake stroke of an engine cycle in a split-injection mode.
Figure 2B:
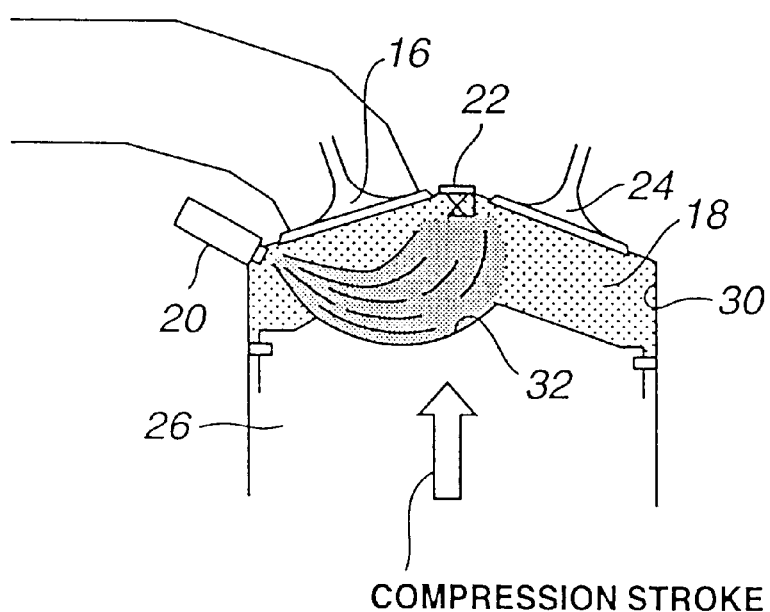
FIG. 2B shows a second injection of a second quantity of fuel into the same combustion chamber during compression stroke of the same engine cycle.

With reference to FIGS. 1 and 2A–2B, FIG. 1 shows an electronic engine controller (EEC) 100 and a spark ignited internal combustion engine 10, which comprises a plurality of cylinders, one of which is shown herein. Engine 10 draws an intake air charge through an intake manifold 12, past a throttle plate 14 and intake valve(s) 16 (see FIGS. 2A to 2E), into combustion chamber 18. An air/fuel mixture, which consists of the air charge and the total quantity of fuel injected by fuel injector 20 for each engine cycle, is ignited by a spark plug 22 in combustion chamber 18, and exhaust gas resulting from combustion of the air/fuel mixture is transported past exhaust valve 24 (see FIGS. 2A, 2B, and 2C) through exhaust manifold 24. A piston 26 is coupled to a crankshaft 28, and moves in a linear fashion within a cylinder defined by cylinder walls 30. With reference to FIGS. 2A, 2B and 2C, a recess 32 within a crown of piston 26 is located below spark plug 22 and engages fuel injected by fuel injector 20 as shown in FIG. 2B during compression stroke to form a rich mixture portion around spark plug 22 at around TDC during compression stroke as shown in FIG. 2C.

Figure 2E:
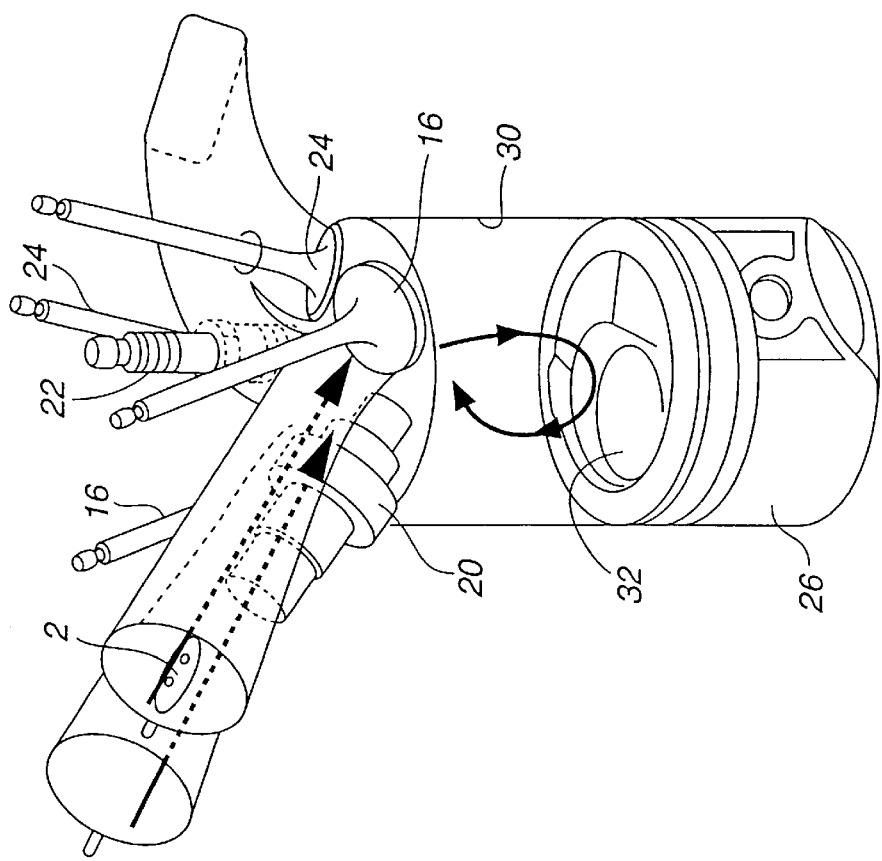
FIG. 2E shows a tumble flow created to provide homogeneous charge in the combustion chamber.
Figure 2D:
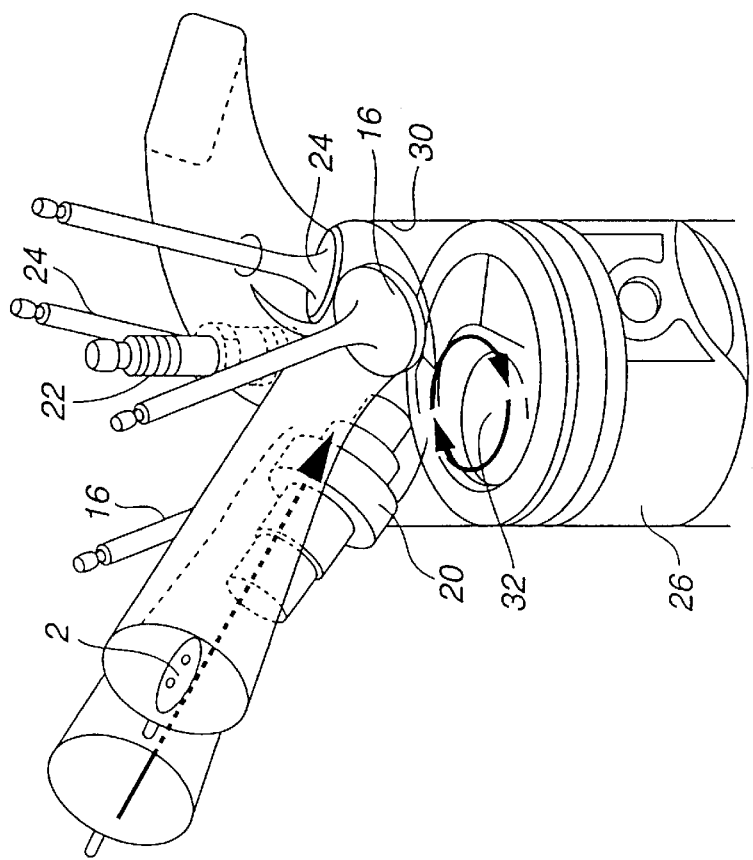
FIG. 2D shows a swirl created to provide stratified charge in the combustion chamber.

With reference to FIGS. 2D and 2E, an air charge induction control using a swirl control (SC) valve 2 will be described. For generating a swirl as shown in FIG. 2D to create a stratified charge, SC valve 2 is closed. For generating a tumble flow, as shown in FIG. 2E, to create a homogeneous charge, SC valve 2 is opened.

A crankshaft position sensor 34 detects the rotation of the crankshaft and transmits a crankshaft position signal 36 to controller 100. Crankshaft position signal 36 preferably takes the form of a series of pulses, each pulse being caused by the rotation of a predetermined point on the crankshaft past sensor 34. The frequency of pulses on the crankshaft position signal 36 is thus indicative of the rotational speed of the engine crankshaft, i.e., engine speed Ne. A throttle position sensor 38 detects the angular position of throttle plate 14 and transmits a throttle position signal 40 to controller 100. Throttle position sensor 38 preferably takes the form of potentiometer and has an idle switch to transmit two-level (ON/OFF) idle signal to controller 100. This idle signal is used for controller 100 to recognize whether or not the engine idles. An accelerator position sensor 4 detects the position of an accelerator pedal 5 and transmits an accelerator an accelerator position signal 6 to controller 100. Accelerator position sensor 4 preferably takes the form of potentiometer. A mass airflow (MAF) sensor 42 detects the mass flow rate of intake air through intake manifold 12 and transmits a flow rate signal 44 to controller 100. MAF sensor 42 preferably takes the form of a hot wire anemometer. An engine coolant temperature sensor 46 detects the temperature Tw of engine coolant circulating within the engine and transmits a coolant temperature signal 48 to controller 100. Engine coolant temperature sensor 46 preferably takes the form of thermistor.

Fuel injector 20 is positioned to inject fuel directly into combustion chamber 18. Fuel injector 20 receives pressurized fuel from a variable pressure fuel supply pump system generally designated at 50 and injects fuel into combustion chamber 18 in response to an injection pulse whose pulse width and beginning time are determined under control, indicated by an arrow 54, of controller 100. Further, controller 100 determines the type of combustion mode required: S.S.C.C. (SPLIT) or H.C.C. (SINGLE), both of which may be switched to meet operator torque demand in accordance with the present invention. Fuel injector 20 has an electronic control valve, the excitation of which in response to injection pulse causes the lifting of a spray tip needle, which causes fuel injection to occur. Referring to FIG. 3, with the same injection pressure, the vertical axis represents variation of quantity of fuel injected during open time of the spray tip needle, while the horizontal axis represents variation of pulse width of injection pulse. As is readily understood from FIG. 3, pulse width less than a minimum pulse width TIMIN may not be relied upon in precise control of the fuel quantity. Accordingly, injection pressure is controlled in a manner to allow fuel injector 20 to inject the fuel quantity required using pulse width greater than or equal to the minimum pulse width TIMIN.

With continuing reference to FIG. 1, fuel injector 20 receives pressurized fuel from variable pressure fuel supply pump system 50, which may employ an electric motor driven pump 56 and an engine driven pump 58. Pump 56 draws fuel from a fuel tank 60 and delivers, past a fuel filter 62, pressurized fuel to pump 58. A pressure regulator 64 located in a fuel return line 66 adjusts pressure of fuel supplied to pump 58. Excessive amount of fuel is returned past return line 66 to fuel tank 60. A return line 68 is provided to return fuel from an outlet of pump 58 to an inlet thereof under the control of a pressure regulator 70. Pressurized fuel from pump 58 is supplied via a delivery line 72 to fuel injector 20. A fuel pressure sensor 74 detects injection pressure of fuel in delivery line 72 and transmits an injection pressure signal 76 to controller 100. Pressure regulator 70 operates under control of an injection pressure control signal 7 generated by controller 100, causing fuel supply pump system 50 to reach a target injection pressure. Variable pressure fuel supply pump system 50 is the variable pressure fuel supply pump system available from Nissan Motor Co., Ltd., Kanagawa, Japan.

Spark plug 22 operates in a conventional manner under control of a spark timing control signal 78 generated by controller 100 to ignite the air/fuel mixture in combustion chamber 18. A throttle actuator 80 moves throttle plate 14 in a conventional manner under control of a throttle control signal 82 generated by controller 100. A SC valve actuator 7 moves SC valve 2 under control of a swirl control signal 8 generated by controller 100. An exhaust gas sensor 84, positioned to sense exhaust gas flowing through an exhaust pipe 86, transmits an exhaust composition signal 88 to controller 100. Exhaust gas sensor 84 preferably takes the form of an A/F sensor that senses the concentration a particular component, such as oxygen, of the exhaust gas. The A/F sensor 84 may take the form an oxygen sensor that senses the oxygen concentration or a so-called wide range A/F sensor. If the oxygen sensor is used, the exhaust gas composition signal 88 is indicative of the oxygen concentration of the exhaust gas, An exhaust gas purifying catalytic converter 90, positioned downstream of A/F sensor 84 processes exhaust gas to reduce at least one of hydrocarbon (HC), nitrogen oxides (NOx) and carbon monoxide (CO) emissions. Catalytic converter 90 may take the form of a three-way catalytic converter or an oxidation catalytic converter or a NOx trap catalytic converter. The three-way catalytic converter processes exhaust gases to reduce HC, NOx and CO emissions. The oxidation catalytic converter oxidizes CO and HC in exhaust gases. The NOx trap catalytic converter traps NOx in exhaust gases when A/F is on the lean side, while it releases the tapped NOx when A/F is at the stoichiometry or on the rich side. An oxygen sensor 92 is positioned to sense exhaust gas flowing out of catalytic converter 90 and transmits an exhaust composition signal 94, which is indicative of the oxygen concentration of the exhaust gas, to controller 100. The provision of oxygen sensor 92 is intended to correct closed loop control based on the output of A/F sensor 84 in a manner to suppress deviation due to deterioration of A/F sensor 84. Oxygen sensor 92 may be removed if there is no need to suppress the control deviation.

A/F sensor 84 is far shorter to warm up to its activation temperature than catalytic converter 90 is. Besides, an electric heater may heat A/F sensor 84 for shortening time required for warm-up of A/F sensor 84. Thus, A/F sensor 84 may be used to carry out feed back control during warm-up period of catalytic converter 90. In the preferred embodiment, the feed back control based on the output of A/F sensor 84 is carried out during the warm-up period of catalytic converter 90 to achieve a stoichiometric air/fuel ratio A/Fsto. in the gases.

An ignition key switch 96, which is manually operable to "ON" position, a "START" position, and an "OFF" position, transmits a representative signal 98, e.g., an ignition switch "ON" signal and a starter switch "ON" signal, which is indicative of the position taken by ignition key switch 96, to controller 100.

In the preferred embodiment of the present invention, controller 100 comprises a microprocessor-based controller with associated microprocessor, represented by a reference numeral 102. Microprocessor 102 communicates with associated computer-readable storage media 104. As will be appreciable by one of ordinary skill in the art, computer-readable storage media 104 may include various devices for storing data representing instructions executable by the microprocessor to control the engine. For example, computer-readable storage media 104 may include a random access memory (RAM) 106, a read-only memory (ROM) 108, and/or a keep-alive memory (KAM) 110. These functions may be performed through any one of a number of known physical devices including EPROM, EEPROM, flash memory, and the like. The present invention is not limited to a particular type of computer-readable storage media, examples of which are provided for convenience of description only.

Figure 4:
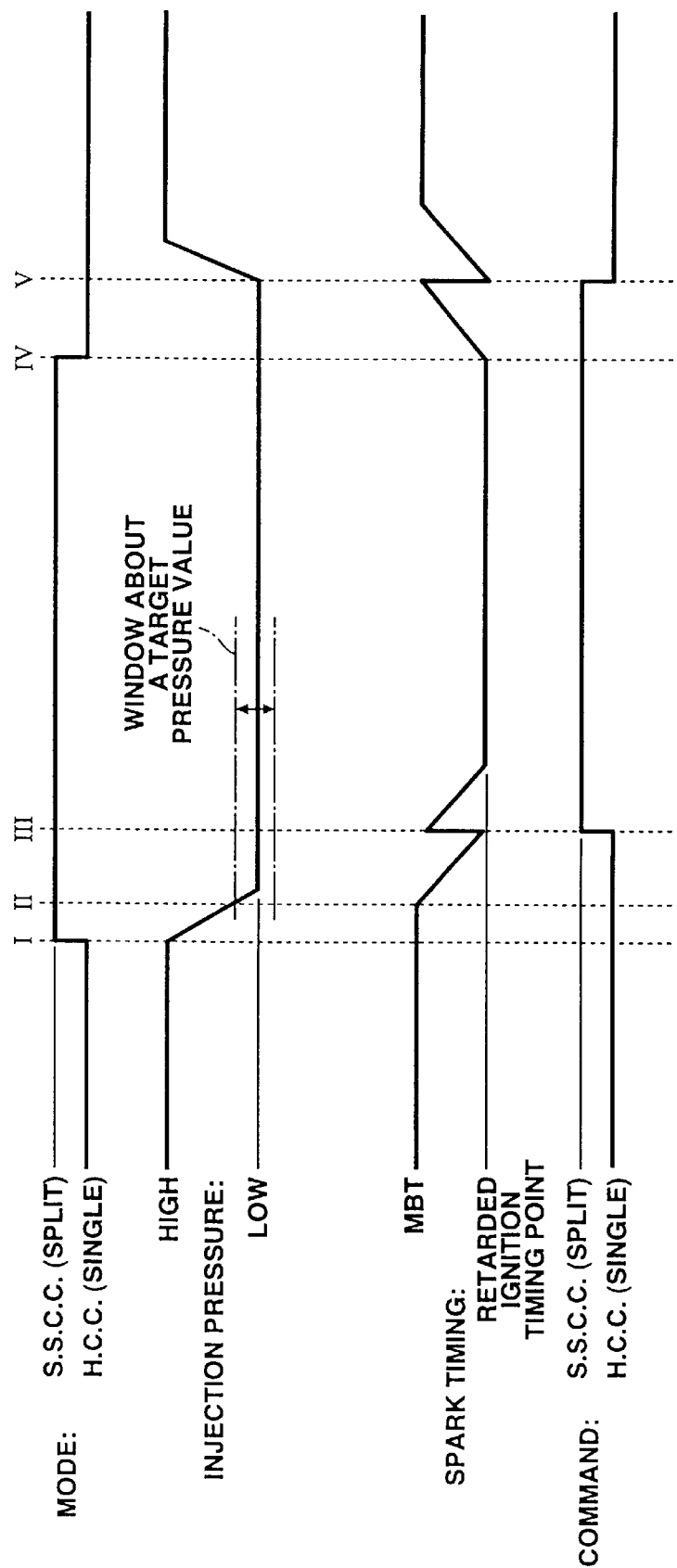
FIG. 4 is a timing diagram illustrating a method of the present invention for controlling a spark ignited internal combustion engine.
Figure 5:
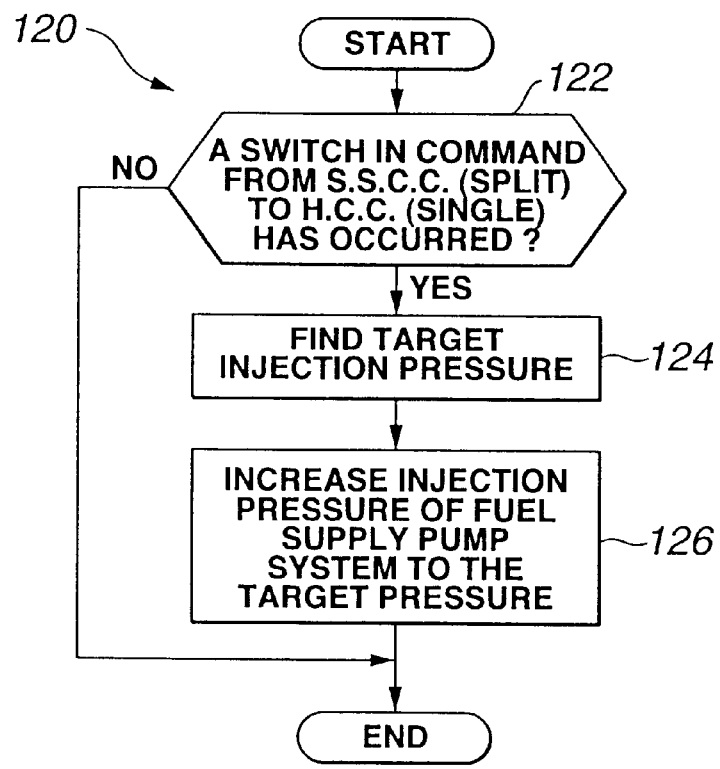
FIG. 5 is a block diagram illustrating a method for achieving target or desired injection pressure upon or immediately after a switch in command from S.S.C.C by employing split-injection, S.S.C.C. (SPLIT), to H.C.C. by employing single-injection, H.C.C. (SINGLE).
Figure 6:
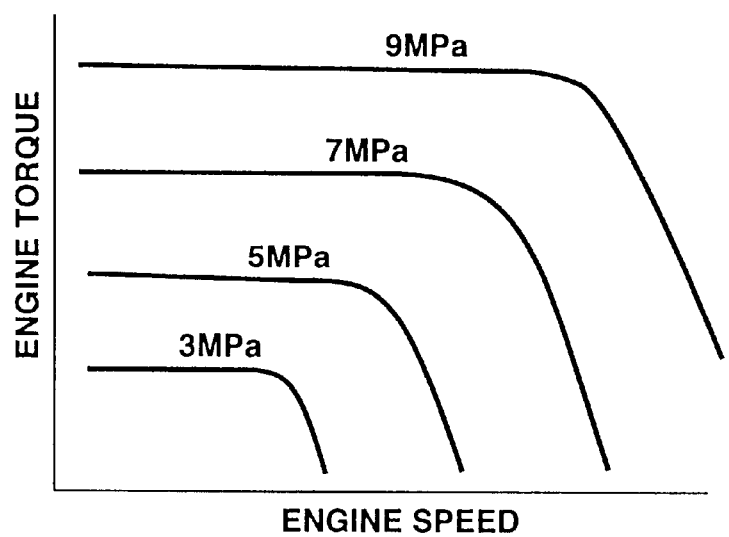
FIG. 6 is a graph illustrating the varying of desired engine torque versus engine speed contour lines with differing injection pressures.
Figure 10:
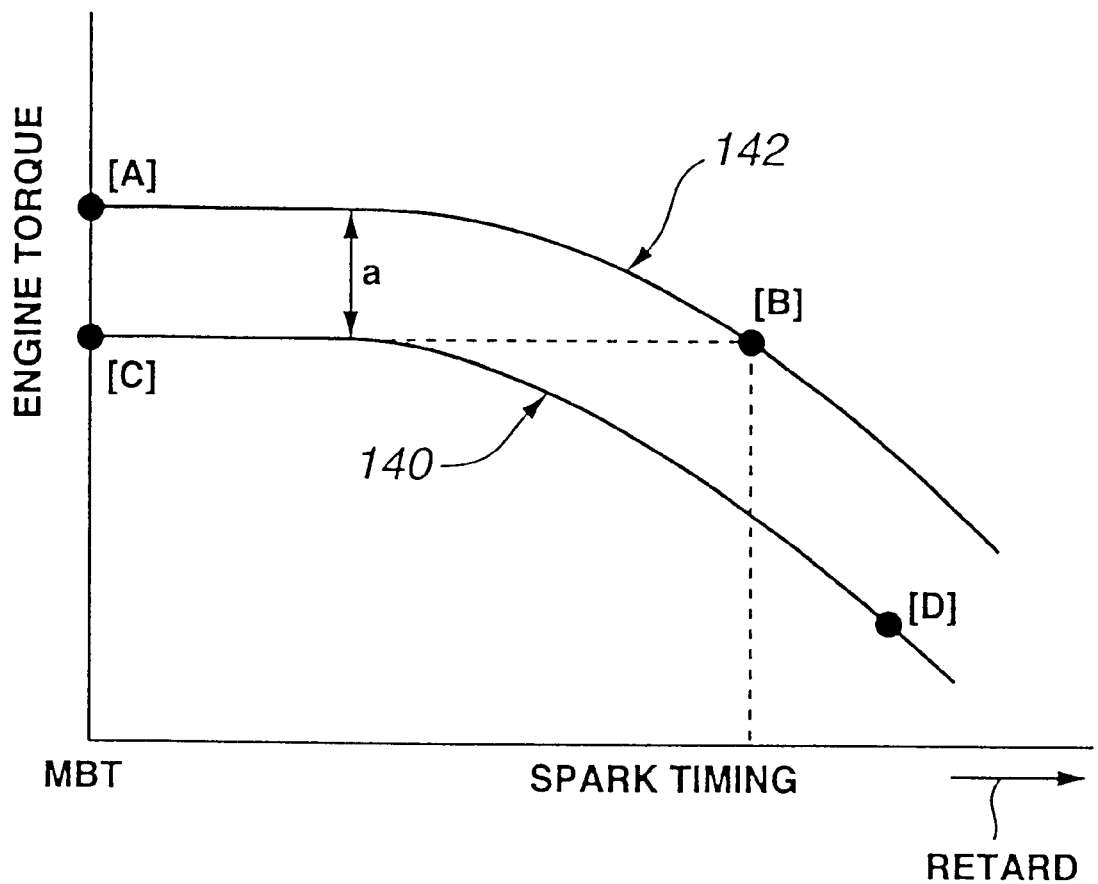
FIG. 10 is a graph illustrating the varying of actually generated engine torque versus spark timing contour lines with a differing combustion types performed.

Referring to FIGS. 4 to 10, a method of controlling injection pressure and spark timing during a switch between H.C.C. (SINGLE) and S.S.C.C. (SPLIT) will now be described. Controller 100 has logic to determine type of combustion required. Examples of such logic will be described later in connection with cold start routines shown in FIGS. 20–21 and FIGS. 26–27, respectively. Engine load may be used for controller 100 to determine H.C.C. (SINGLE) or S.S.C.C. (SPLIT) required. In FIG. 4, prior to moment I, both mode and command are at H.C.C. (SINGLE) indicative levels, respectively. Controller 100 determines a target or desired injection pressure based on engine speed and desired engine torque from a look-up table as shown in FIG. 6. Under control of fuel injection pressure control signal 71, fuel supply pump system 50 holds rail pressure for fuel injection high at the target injection pressure. In FIG. 4, a level labeled HIGH represents this target injection pressure. Controller 100 determines an ignition timing point, which produces the best combustion stability for H.C.C. (SINGLE). In preferred embodiments according to the present invention, the spark timing is at MBT (Minimum Spark Advance of Best Torque) to ignite air/fuel mixture charge created by performing single fuel injection for each engine cycle during intake stroke. Referring to FIG. 10, the illustrated curve 142 indicates the varying of engine torque generated due to H.C.C. (SINGLE) with differing spark timings. The curve 140 indicates the varying of engine torque generated due to S.S.C.C. (SPLIT) with differing spark timings. With the same ignition timing point, there occurs a difference in torque as represented by the reference numeral a between H.C.C. (SINGLE) and S.S.C.C. (SPLIT). This difference in torque results from a difference in thermal efficiency between H.C.C. (SINGLE) and S.S.C.C. (SPLIT). In FIG. 10, the bracketed character [A] represents MBT for H.C.C. (SINGLE). As will be readily appreciated by those skilled in the art that retarding the spark timing from MBT [A] to a point as represented by [B] along curve 142, for example, causes a drop as much as the difference a in torque. The bracketed character [C] represents MBT for S.S.C.C (SPLIT).

Referring back to FIG. 4, at moment I, a switch, in mode, from H.C.C. (SINGLE) to S.S.C.C. (SPLIT) takes place. Upon this switch, in mode, controller 100 determines a target injection pressure for S.S.C.C. (SPLIT), causing pump system 50 to decrease fuel pressure down toward the target injection pressure. In FIG. 4, a level labeled LOW represents the target injection pressure for S.S.C.C. (SPLIT). Controller 100 may adjust the rate at which fuel pressure varies by modifying duty-cycle of injection pressure control signal 71.

At moment II when fuel pressure falls in a window about the target injection pressure for S.S.C.C. (SPLIT), controller 100 begins to retard the spark timing from MBT [A] toward a retarded ignition timing point [B] (see FIG. 10) at a controlled rate. This movement in spark timing causes engine torque to drop along line 142 (see FIG. 10). Controller 100 may adjust the rate at which the spark timing is retarded by varying spark timing control signal 78.

At moment III when the retarded ignition timing point [B] is achieved, controller 100 causes command to switch from H.C.C. (SINGLE) to S.S.C.C. (SPLIT). In response to this switch, in command, from H.C.C. (SINGLE) to S.S.C.C. (SPLIT), controller 100 causes fuel injector 20 to perform split injection and causes the spark timing to jump from [B] to MBT [C]. The split injection consists of injecting for each engine cycle a first quantity of fuel during intake stroke and a second quantity of fuel during compression stroke of the same engine cycle. With reference also to FIG. 10, concurrently with the switch in combustion type at moment III, the spark timing jumps from [B] to MBT[C]. This jump in spark timing is timed with the switch in combustion type such that S.S.C.C. (SPLIT) at MBT [C] occurs at moment III, which generates engine torque as high as engine torque that was generated by H.C.C. (SINGLE) at the spark timing point [B] prior to moment III. Immediately after this jump in spark timing, controller 100 retards spark timing from MBT [C] toward a retarded ignition timing point [D] at a controlled rate. This movement of the spark timing causes a drop in engine torque along line 140.

From the preceding description in connection with FIGS. 4 and 10, it will be understood by those skilled in the art that the jump of spark timing, in advancing direction, from [B] to MBT [C] in timed with the switch in command from H.C.C. (SINGLE) to S.S.C.C. (SPLIT) can fill the difference a, in engine torque, between the two combustion types during the switch from H.C.C. (SINGLE) to S.S.C.C. (SPLIT). With this control strategy, an objectionable change, in engine torque, that would otherwise occur during switch from H.C.C. (SINGLE) to S.S.C.C. (SPLIT) is eliminated or at least reduced.

With reference now to FIGS. 7–9 and FIG. 4 as well, after moment III, injection pressure is held at the target pressure for split injection, which is lower than the target pressure for single injection. As shown in FIG. 7, two discrete pulses 130 and 132 excite fuel injector 20 to inject first quantity of fuel during intake stroke of each engine cycle, and to inject second quantity of fuel during compression stroke of the same engine cycle. In FIGS. 7 to 9, the reference characters CTIH and TITMH indicate a pulse width and a pulse time (or timing) of injection pulse 130, respectively. The reference characters CTIS and TITMS indicate a pulse width and a pulse time (or timing) of injection pulse 132, respectively. Pulse time TITMH is expressed in terms of a number of degrees of crankshaft position from TDC of intake stroke of each engine cycle, and pulse time TITMS is expressed in terms of a number of degrees of crankshaft position from bottom dead center (BDC) of intake stroke of the same engine cycle. As best seen in FIG. 8, a desired TITMH is determined from pulse width CTIH and engine speed. Engine speed contour lines are shown to illustrate the varying of TITMH with differing CTIH. As best seen in FIG. 9, a desired TITMS is determined from pulse width CTIS and engine speed. Engine speed contour lines are shown to illustrate the varying of TITMS with differing CTIS.

With reference again to FIGS. 4 and 10, at moment IV, a switch, in mode, from S.S.C.C. (SPLIT) to H.C.C. (SINGLE) takes place. Upon this switch, controller 100 begins to advance the spark timing from retarded point [D] toward MBT [C] (see FIG. 10) at a controlled rate. This movement in spark timing causes an increase in engine torque along line 140 (see FIG. 10). Controller 100 may adjust the rate at which spark timing is advanced by varying spark timing control signal 78.

At moment V when MBT [C] is achieved, controller 100 causes command to switch from S.S.C.C. (SPLIT) to H.C.C. (SINGLE). At the same moment, controller 100 determines a target injection pressure for H.C.C. (SINGLE), causing pump system 50 to increase fuel pressure up toward the target injection pressure. In FIG. 4, a level labeled HIGH represents the target injection pressure for H.C.C. (SINGLE). Controller 100 may adjust the rate at which fuel pressure varies by modifying duty-cycle of injection pressure control signal 71.

In response to the switch, in command, from S.S.C.C. (SPLIT) to H.C.C. (SINGLE) at moment V, controller 100 causes fuel injector 20 to perform single injection and causes the spark timing to jump from MBT [C] to [B]. The single injection for H.C.C. (SINGLE) consists of injecting a quantity of fuel during intake stroke of each engine cycle. With reference also to FIG. 10, concurrently with the switch in combustion type at moment V, the spark timing jumps from MBT [C] to [B]. This jump in spark timing is timed with the switch in combustion type such that H.C.C. (SINGLE) at [B] occurs at moment V, which generates engine torque as high as engine torque that was generated by S.S.C.C. (SPLIT) at MBT [C] prior to moment V. Immediately after this jump in spark timing, controller 100 advances spark timing from [B] to MBT [A] at a controlled rate. This movement of spark timing causes an increase in engine torque along line 142.

From the preceding description in connection with FIGS. 4 and 10, it will be understood by those skilled in the art that the jump of spark timing, in retarding direction, from MBT[C] to [B] in timed with the switch in command from S.S.C.C. (SPLIT) to H.C.C. (SINGLE) can fill the difference a, in engine torque, between the two combustion types during the switch from S.S.C.C. (SPLIT) to H.C.C. (SINGLE). With this control strategy, an objectionable change, in torque, that would otherwise occur during switch from S.S.C.C. (SPLIT) to H.C.C. (SINGLE) is eliminated or at least reduced.

As will be later described in connection with FIG. 22, an available spark timing range for each combustion type must be determined taking into account combustion stability. An available spark timing range for S.C.C.C (SPLIT) extends in retarding direction further than an available spark timing range for H.C.C. (SINGLE) does. These ranges have a "spark timing range overlap" (STR overlap). As readily understood from FIG. 10, at each ignition timing point of the STR overlap, there is a difference in engine torque between the two combustion types. However, under the same operating conditions, the inventors have found two ignition timing points within the STR overlap, one for S.S.C.C. (SPLIT), the other for H.C.C. (SINGLE), which cause generation of engine torques, the difference of which is zero or lower than an acceptable magnitude. In FIG. 10, two such ignition timing points are labeled [C] and [B], respectively. The before-mentioned jump in timed with the switch in combustion type occurs between these two ignition timing points. This jump should occur if the operating circumstances require elimination or reduction of the difference, in engine torque, that would occur during a switch between S.S.C.C. (SPLIT) and H.C.C. (SINGLE) with the ignition timing point unaltered. However, if the occurrence of such difference in engine torque is not objectionable to the vehicle operator, the jump between the two different ignition timing points may not be needed. Preferably, operator torque demand is taken into account in determining whether or not the jump in spark timing is needed in the spark timing control strategy.

With continuing reference to FIG. 10, the ignition timing point [D] is employed as a target retarded ignition timing point for S.S.C.C (SPLIT). The target ignition timing point [D] is retarded by an appreciable amount from MBT[C] for S.S.C.C. (SPLIT) to achieve rapid warm-up of exhaust system components including catalyst during cold start of the engine. The amount by which the point [D] is retarded from MBT [C] may be reduced in accordance with the progress of warm-up of exhaust system components if engine torque increase that may result from the varying of ignition timing point is acceptable. This dependency is advantageous in reducing delay time between moment IV when switch, in mode, from S.S.C.C. (SPLIT) to H.C.C. (SINGLE) occurs and moment V when switch, in command, from S.S.C.C. (SPLIT) to H.C.C. (SINGLE) occurs.

Referring to FIG. 4, in embodiments according to the present invention, the varying of spark timing from moment IV to moment V is modified to provide proper transient operation of the engine to meet operator torque demand.

With continuing reference to FIG. 4, it will be appreciated, as an advantage, by those skilled in the art that the injection pressure is held low at the target pressure from a certain moment prior to moment III to moment V to achieve precise control over lower fuel quantities for split injection during S.S.C.C. (SPLIT). At the moment III, a switch, in command, from H.C.C. (SINGLE) to S.S.C.C. (SPLIT) occurs. At the moment V, a switch, in command, from S.S.C.C. (SPLIT) to H.C.C. (SINGLE) occurs. It will also be appreciated that the injection pressure begins to increase from the target pressure for S.S.C.C (SPLIT) toward a target pressure for H.C.C. (SINGLE) upon or immediately after the moment V to enable injection of increased fuel quantity.

With reference now to FIG. 5, a method of determining a target pressure for single injection of H.C.C. (SINGLE) is generally indicated at 120. At block 122, a determination is made whether a switch, in command, from S.S.C.C. (SPLIT) to H.C.C. (SINGLE) has occurred. If this is not the case (NO), the process goes to an end. If the switch has occurred (YES), the process goes to block 124. At block 124, a target or desired injection pressure for single injection is found from FIG. 6 using desired engine torque and current engine speed. At block 126, fuel supply pump system 50 is allowed to increase fuel pressure to achieve the target pressure found at block 124.

Figure 11:
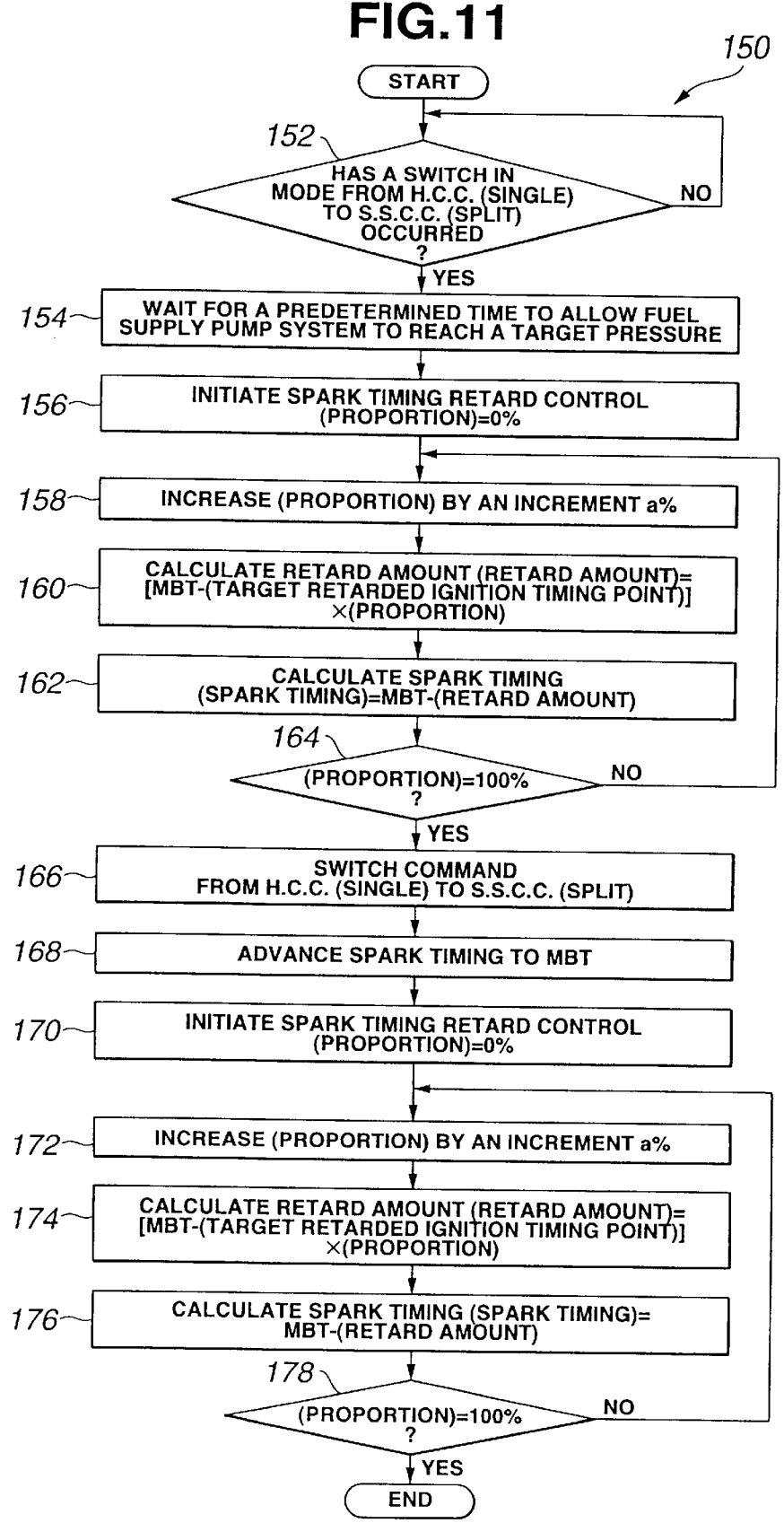
FIG. 11 is a block diagram illustrating a spark timing control routine for controlling spark timing to provide smooth torque change upon or immediately after occurrence of a switch in mode from H.C.C. (SINGLE) to S.S.C.C. (SPLIT).

Referring now to FIG. 11, a method of controlling spark timing and injection pressure during switch from H.C.C. (SINGLE) to S.S.C.C. (SPLIT) is generally indicated at 150. At block 152, controller 100 determines whether or not a switch, in mode, from H.C.C. (SINGLE) to S.S.C.C. (SPLIT) has occurred. If this is not the case (NO), the process returns to start point. If this is the case (YES), the process goes to block 154 (see moment I in FIG. 4). At block 154, controller 100 waits for a period of time to allow pump system 50 to decrease injection pressure down to reach target pressure for split injection. After block 154, the process goes to block 156 upon the target pressure for split injection being reached (moment II in FIG. 4). At block 156, controller 100 sets "proportion" equal to 0% to initiate spark timing retard control. At block 158, controller 100 increases the proportion by an increment of a %. For example, a % may be 1%. In this case, as the unit time is 10 milliseconds, the proportion increases at a rate of 1% per 10 milliseconds. At block 160, controller 100 calculates "retard amount" that is expressed as:

(RETARD AMOUNT)=[$MBT$-(TARGET RETARDED IGNITION TIMING POINT)]×(PROPORTION)  Eq. 1.

The MBT and target retarded ignition timing point in the equation 1 are indicated at [A] and [B], respectively, in FIG. 10. At block 162, controller 100 calculates spark timing that is expressed as:

(SPARK TIMING)=$MBT$-(RETARD AMOUNT)  Eq. 2.

The MBT in the equation 2 is indicated at [A] in FIG. 10. Controller 100 alters spark timing control signal 78 to cause spark plug 22 to ignite the air/fuel mixture in combustion chamber 18 at the calculated spark timing. At block 164, controller 100 determines whether or not the proportion is equal to 100%. If this is not the case (NO), the process returns to block 158. If this is the case (YES), the process goes to block 166. Controller 100 recognizes that the spark timing has been retarded to the target retarded ignition timing point as indicated at [B] in FIG. 10 (see moment III in FIG. 4) upon determination that the proportion is equal to 100%.

At block 166, controller 100 causes a switch, in command, from H.C.C. (SINGLE) to S.S.C.C. (SPLIT) to occur. In response to the occurrence of switch to S.S.C.C. (SPLIT) command, controller 100 causes fuel injector 20 to perform split injection by injecting fuel into combustion chamber 18 for each engine cycle during intake stroke and injecting again during compression stroke of the same engine cycle. Concurrently with the switch, in command, at block 166, controller 100 causes spark timing to jump, at block 168, in advancing direction, from the retarded ignition timing point [B] to MBT that is indicated at [C] in FIG. 10. At the next block 170, controller 100 sets the proportion equal to 0% again to initiate spark timing retard control from MBT [C]. At block 172, controller 100 increases the proportion by increment a %. At block 174, controller calculates retard amount that is expressed as:

(RETARD AMOUNT)=[$MBT$-(TARGET RETARDED IGNITION TIMING POINT)]×(PROPORTION)  Eq. 3.

The MBT and target retarded ignition timing point in equation 3 are indicated at [C] and [D], respectively, in FIG. 10. At block 176, controller 100 calculates spark timing that is expressed as:

(SPARK TIMING)=$MBT$-(RETARD AMOUNT)  Eq. 4.

The MBT in the equation 4 is indicated at [C] in FIG. 10. Controller 100 alters spark timing control signal 78 to cause spark plug 22 to ignite the air/fuel mixture in combustion chamber 18 at the calculated spark timing. At block 178, controller 100 determines whether or not the proportion is equal to 100%. If this is not the case (NO), the process returns to block 172. If this is the case (YES), the process goes to end point. Controller 100 recognizes that the spark timing has been retarded to the target retarded ignition timing point as indicated at [D] in FIG. 10 upon determination that the proportion is equal to 100%.

Figure 12:
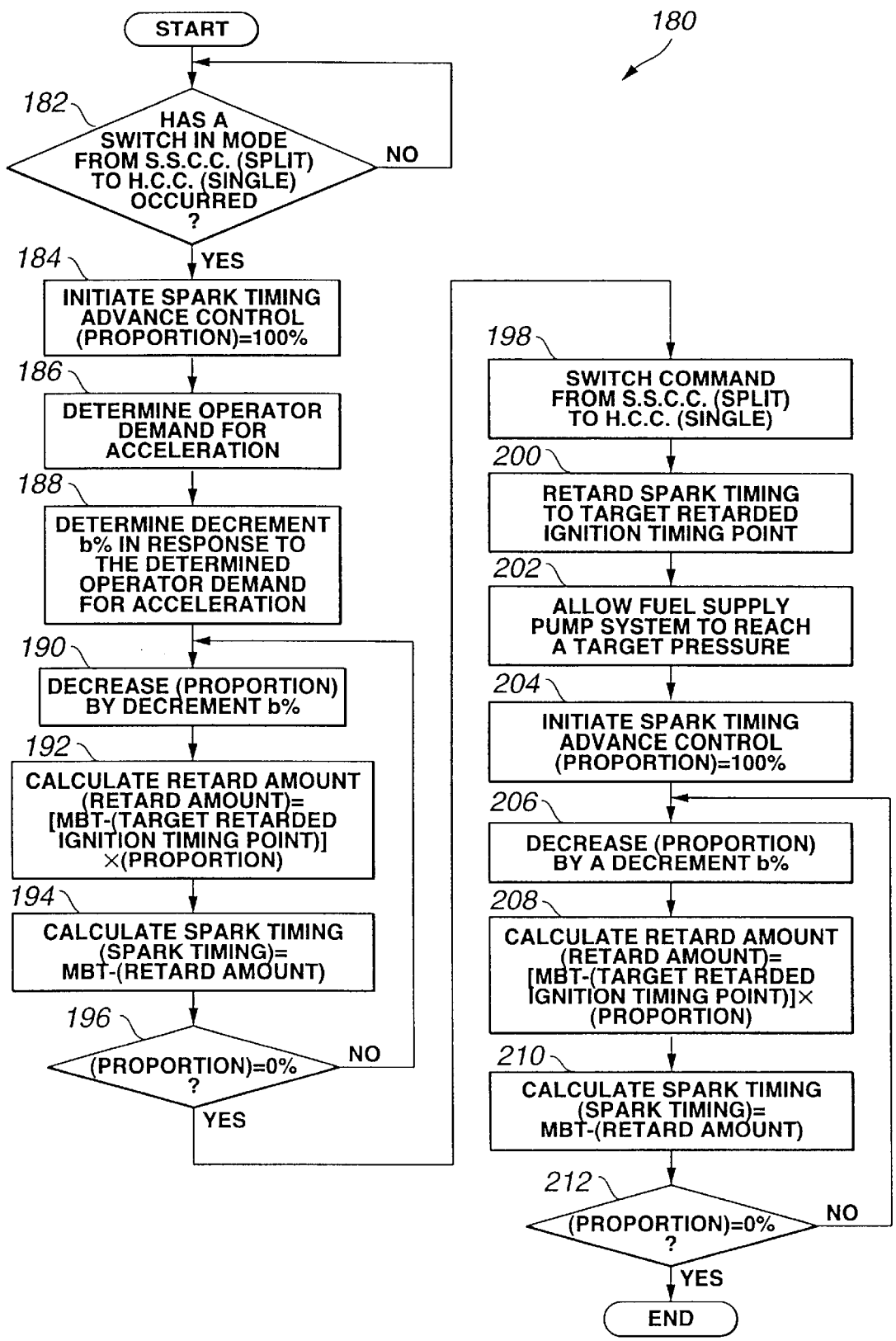
FIG. 12 is a block diagram illustrating a spark timing control routine, implementing the present invention, for controlling spark timing to provide a quick response to an increase in torque demand when the engine operates on S.S.C.C. (SPLIT) during operation to warm up catalyst.

Referring next to FIG. 12, a method of the present invention of controlling spark timing during switch from S.S.C.C (SPLIT) to H.C.C. (SINGLE) is generally indicated at 180. At block 182, controller 100 determines whether or not a switch, in mode, from S.S.C.C. (SPLIT) to H.C.C. (SINGLE) has occurred. If this is not the case (NO), the process returns to start point. If this is the case (YES), the process goes to block 184 (see moment IV in FIG. 4).

At block 184, controller 100 sets "proportion" equal to 100% to initiate spark timing advance control.

At the next block 186, controller 100 determines operator torque demand for acceleration. Such operator torque demand may be determined from the accelerator position rate. The accelerator position rate may be indicated by a change in accelerator position over unit time of 10 milliseconds. Operator torque demand may be determined from the throttle position rate as long as the throttle angle of throttle plate 14 holds linearity with the accelerator angle of accelerator pedal 5. The throttle position rate may be indicated by a change in throttle position over unit time of 10 milliseconds. After block 186, the process goes to block 188. At block 188, controller 100 determines a decrement b % in response to the determined operator torque demand in such a manner that will be described later in connection with FIGS. 16–19. Then, the process goes to block 190.

At block 190, controller 100 decreases the proportion by the determined decrement b %. At the next block 192, controller 100 calculates "retard amount" that is expressed as:

(RETARD AMOUNT)=[$MBT$-(TARGET RETARDED IGNITION TIMING POINT)]×(PROPORTION)  Eq. 5.

The MBT and target retarded ignition timing point in the equation 5 are indicated at [C] and [D], respectively, in FIG. 10. At block 194, controller 100 calculates spark timing that is expressed as:

(SPARK TIMING)=$MBT$-(RETARD AMOUNT)  Eq. 6.

The MBT in the equation 6 is indicated at [C] in FIG. 10. Controller 100 alters spark timing control signal 78 to cause spark plug 22 to ignite the air/fuel mixture in combustion chamber 18 at the calculated spark timing. At block 196, controller 100 determines whether or not the proportion is equal to 0%. If this is not the case (NO), the process returns to block 190. If this is the case (YES), the process goes to block 198. Controller 100 recognizes that the spark timing has been advanced to the MBT as indicated at [C] in FIG. 10 (see moment V in FIG. 4) upon determination that the proportion is equal to 0%.

At block 198, controller 100 causes a switch, in command, from S.S.C.C. (SPLIT) to H.C.C. (SINGLE) to occur. In response to the occurrence of switch to H.C.C. (SINGLE) command, controller 100 causes fuel injector 20 to perform single injection by injecting fuel into combustion chamber 18 for each engine cycle during intake stroke. Concurrently with the switch at block 198, controller 100 causes spark timing to jump, at block 200, in retarding direction, from MBT as indicated at [C] in FIG. 10. At the same time, controller 100 allows pump system 50 to start increasing injection pressure, at block 202, to reach a target injection pressure for single injection. At the next block 204, controller 100 sets the proportion equal to 100% again to initiate spark timing advance control from [B]. At block 202, controller 100 decreases the proportion by decrement b %. At block 208, controller calculates retard amount that is expressed as:

$$(\text{RETARD AMOUNT}) = [MBT - (\text{TARGET RETARDED IGNITION TIMING POINT})] \times (\text{PROPORTION}) \quad \text{Eq. 7}$$

The MBT and target retarded ignition timing point in equation 7 are indicated at [A] and [B], respectively, in FIG. 10. At block 210, controller 100 calculates spark timing that is expressed as:

$$(\text{SPARK TIMING}) = MBT - (\text{RETARD AMOUNT}) \quad \text{Eq. 8}$$

The MBT in the equation 8 is indicated at [A] in FIG. 10. Controller 100 alters spark timing control signal 78 to cause spark plug 22 to ignite the air/fuel mixture in combustion chamber 18 at the calculated spark timing. At block 212, controller 100 determines whether or not the proportion is equal to 0%. If this is not the case (NO), the process returns to block 206. If this is the case (YES), the process goes to end point. Controller 100 recognizes that the spark timing has been advanced to the MBT as indicated at [A] in FIG. 10 upon determination that the proportion is equal to 0%.

From the preceding description, it will now be understood by those skilled in the art that the jump in spark timing discussed in connection with FIG. 10 is carried out by controller 100 at block 168 in FIG. 11 or at block 200 in FIG. 12.

Figure 13:
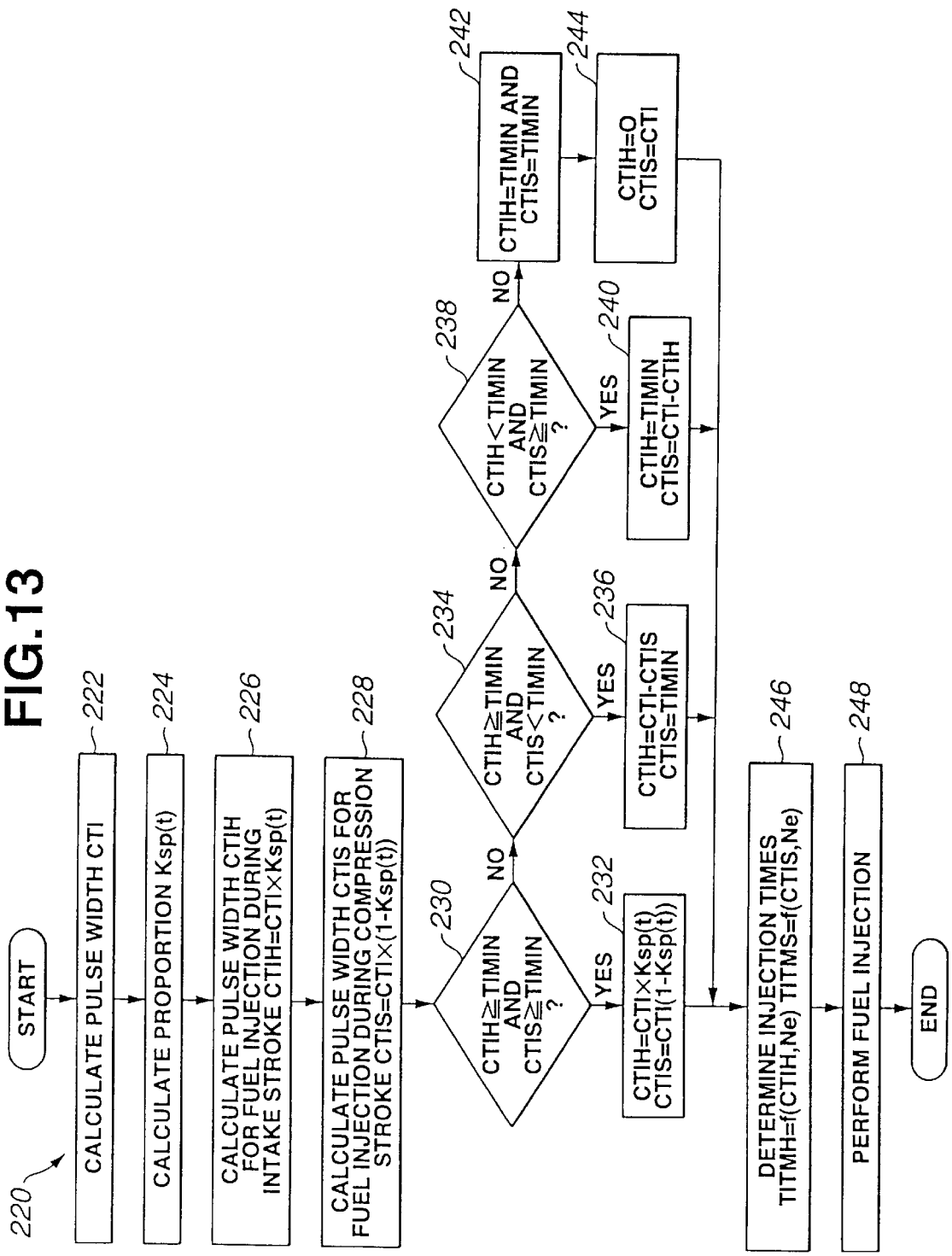
FIG. 13 is a block diagram illustrating a fuel injection control routine to perform split injection during engine operation on S.S.C.C. (SPLIT).

With reference now to FIG. 13, a method of determining pulse width in split injection mode is generally indicated at 220. At block 222, an effective pulse width CTI is calculated. The pulse width CTI is determined based on engine speed Ne, mass flow rate Qa, and various correction coefficients. Specifically, a base pulse width Tpt is determined. Base pulse width Tpt is expressed as:

$$Tpt = c \times Qa/Ne \quad \text{Eq. 9}$$

where: c is constant.

Then, the effective pulse width CTI is expressed as:

$$CTI = Tpt \times (1 + Kw + Kas + \ldots) \times LAMD \times Z + Ts \quad \text{Eq. 10}$$

where: Kw is coolant temperature dependent correction coefficient;

Kas is engine start enrichment correction coefficient;

LAMD is A/F feedback correction coefficient;

Z is target A/F ratio correction coefficient; and

Ts is battery correction coefficient.

The A/F feedback correction coefficient LAMD varies as a result of PI (proportional and integral) control based on exhaust composition signal 88 from A/F sensor 84. If A/F feedback is not needed, the correction coefficient LAMD is kept at 1.0.

At block 224, controller 100 calculates a proportion Ksp(t), which is expressed as:

$$Ksp(t) = Ksp(t-1) - dKsp \quad \text{Eq. 11}$$

where: t represents a number of executions of the routine 220;

Ksp(t) represents the present value of the proportion;

Ksp(t−1) represents the previous value of the proportion;

dKsp represents an increment;

Ksp(0)=1; and

Ksp(t)≧Ksp0.

Controller 100 determines proportion Ksp(t) from the equation 11 upon or after permission of A/F feedback stoichiometry control. If A/F feedback control has been permitted, Ksp(t) decreases from 1 (one) to Ksp0 by dKsp per unit period of time, for example 10 milliseconds.

At block 226, pulse width CTIH for fuel injection during intake stroke is calculated using Ksp(t). Pulse width CTIH is expressed as:

$$CTIH = CTI \times Ksp(t) \quad \text{Eq. 12.}$$

At block 228, pulse width CTIS for fuel injection during compression stroke is calculated using Ksp(t). Pulse width CTIS is expressed as:

$$CTIS = CTI \times (1 - Ksp(t)) \quad \text{Eq. 13.}$$

At blocks 230 to 244, the pulse widths CTIH and CTIS determined at blocks 226 and 228 are compared to the minimum pulse width TIMIN. The process goes from block 228 to block 230.

At block 230, controller 100 determines whether or not CTIH≧TIMIN and CTIS≧TIMIN. If this is the case (YES), the process goes to block 232 where the pulse widths CTIH and CTIS determined at blocks 226 and 228 are used as the final CTIH and CTIS. If this is not the case (NO), the process goes to block 234.

At block 234, controller 100 determines whether or not CTIH≧TIMIN and CTIS<TIMIN. If this is not the case (NO), the process goes to block 238. If this is the case (YES), the process goes to block 236. At block 236, CTIS is set equal to TIMIN, and CTIH is determined by subtracting CTIS (=TIMIN) from CTI. Controller 100 uses CTIH ands CTIS determined at block 236 as their final versions.

At block 238, controller 100 determines whether or not CTIH<TIMIN and CTIS≧TIMIN. If this is not the case (NO), the process goes to block 242. If this is the case (YES), the process goes to block 240. At block 240, CTIH is set equal to TIMIN, and CTIS is determined by subtracting CTIH (=TIMIN) from CTI. Controller 100 uses CTIH and CTIS determined at block 240 as their final versions.

At block 242, controller 100 recognizes that CTIH<TIMIN and CTIS<TIMIN. At block 244, CTIH is set equal to 0 (zero) and CTIS is set equal to CTI. Controller 100 uses CTIH and CTIS determined at block 244 as their final versions.

From blocks 232, 236, 240 and 244, the process goes to block 246. At block 246, controller 100 determines injection time (or timing) TITMH (see FIG. 7) and injection time TITMS (see FIG. 7). As best seen in FIG. 8, TITMH is determined from the final pulse width CTIH and engine speed Ne. As best seen in FIG. 9, TITMS is determined from the final pulse width CTIS and engine speed Ne.

At block 248, controller 100 causes fuel injector 20 to perform split injection.

As will be appreciated from the preceding description in connection with FIGS. 4 and 12, in the preferred embodiment, a delay between moments IV and V is varied to meet operator torque demand. Operator torque demand is monitored. The monitored operator torque demand determines the decrement b %. The decrement b % determines speed at which spark timing is advanced, and thus a period of time of the delay. With reference to FIG. 10, the quicker the spark timing is advanced from [D] to [C], the quicker the engine torque increases during the delay between IV and V (see FIG. 4). The shorter the delay is, the shorter the transient period taken for a switch from S.S.C.C. (SPLIT) to H.C.C. (SINGLE) is. Properly determining decrement b % against the monitored operator torque demand will nicely blend the above-mentioned two factors with each other to provide enhanced acceleration demand. Upon or immediately after ending of the delay, injection pressure is increased quickly to provide complete setting for single injection, enabling injection of increased quantity of fuel required for enhanced acceleration.

FIGS. 14A to 14H show a timing diagram illustrating enhanced acceleration to meet operator torque demand for rapid acceleration, while FIGS. 15A to 15H show a timing diagram illustrating enhanced acceleration to meet operator torque demand for less rapid acceleration. In this example, the throttle rate ΔTVO is used as a parameter indicative of operator torque demand. The monitored throttle rate ΔTVO is compared with a predetermined throttle rate threshold $\Delta TVO_{THR}$. If $\Delta TVO < \Delta TVO_{THR}$, decrement b % is set equal to a first value. If $\Delta TVO < \Delta TVO_{THR}$, decrement b % is set equal to a second value greater than the first value. Comparing the engine speed contour line of FIG. 14D with that of FIG. 15D clearly indicates the enhanced acceleration to meet operator torque demand.

Figure 16:
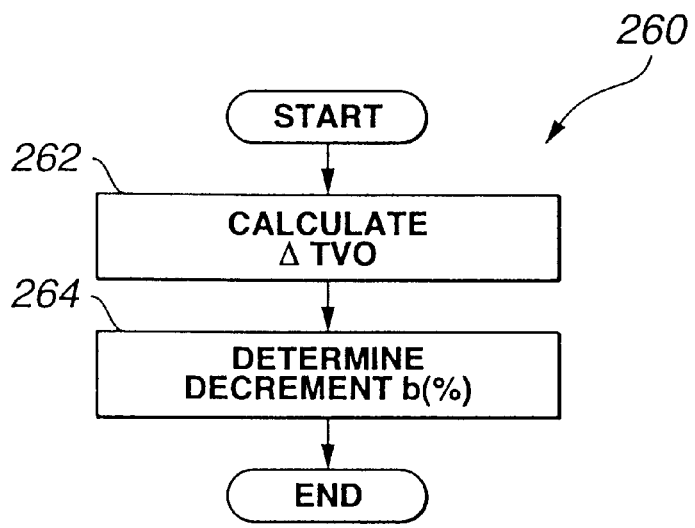
FIG. 16 is a block diagram illustrating a method of determining a decrement b % of a proportion that plays an important role in calculating a current point of spark timing between MBT and a target retarded ignition timing point in the spark timing control routine shown in FIG. 12.
Figure 17:
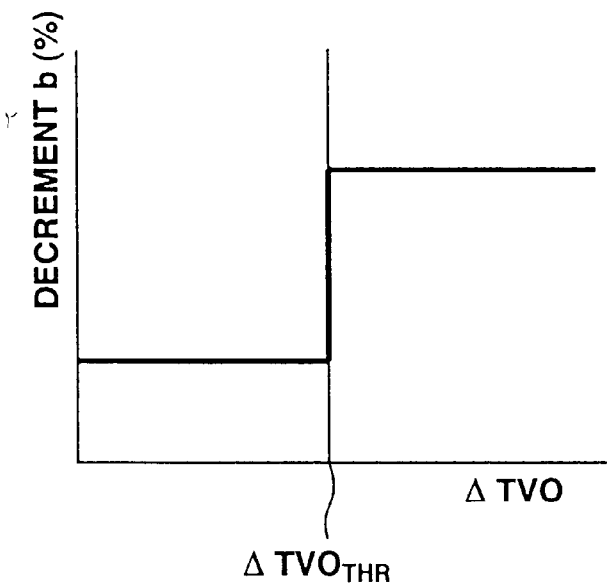
FIG. 17 is a graph depicting the varying of decrement b % with differing throttle rates (ΔTVO) in one embodiment of the present invention.

Referring to FIG. 16, a method of the present invention for determining decrement b % in response to operator torque demand is generally indicated at 260. In this implementation, controller 100 monitors throttle position TVO from throttle position signal 40 as operator power or torque demand. In other embodiments, accelerator angle may be monitored as operator power or torque demand. At block 262, controller 100 calculates a throttle rate ΔTVO, i.e., a change in throttle position TVO over unit time of 10 milliseconds. At block 264, controller 100 determines decrement b % based on the throttle rate ΔTVO from a look-up table as shown in FIG. 17. Controller 100 monitors throttle rate ΔTVO as a parameter indicative of operator torque demand. If desired, operator torque demand may be determined by calculating an accelerator rate, i.e., a change in accelerator position over unit time of 10 milliseconds. With continuing reference to FIG. 17, decrement b % has two values, namely a low value and a high value. A throttle rate threshold $\Delta TVO_{THR}$ is established. Controller 100 compares throttle rate ΔTVO to threshold $\Delta TVO_{THR}$. If ΔTVO is less than $\Delta TVO_{THR}$, controller 100 determines the presence of operator torque demand for less rapid acceleration and uses the low value as decrement b %. If ΔTVO is greater than or equal to $\Delta TVO_{THR}$, controller 100 determines the presence of operator torque demand for rapid acceleration and uses the high value as decrement b %.

With reference to FIGS. 14F and 15F, the slope of spark timing contour line between moments IV and V is steeper when decrement b % takes the high value than it is when decrement b % takes the low value. In other words, the delay is shorter in response to operator torque demand for rapid acceleration than it is in response to operator torque demand for less rapid acceleration. As mentioned before, the ending of this delay triggers increase of injection pressure (see FIGS. 14E and 15E). It will now be appreciated, as an advantage, by those skilled in the art that the target injection pressure for single-injection is achieved at an early point after occurrence of operator torque demand for rapid acceleration, so that the total quantity of fuel required for rapid acceleration can be injected quickly to allow smooth increase in engine speed as shown in FIG. 14D. It will also be appreciated that, as shown in FIGS. 15C–15F, mild engine speed increase is achieved due to gradual increase in torque in response to operator torque demand for less rapid acceleration because decrement b % takes the low value.

Figure 18:
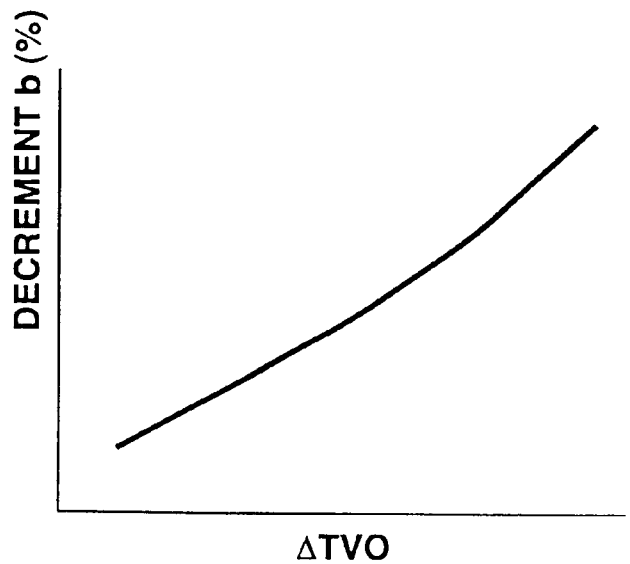
FIG. 18 is a graph depicting the varying of decrement b % with differing throttle rates (ΔTVO) in another embodiment of the present invention.
Figure 19:
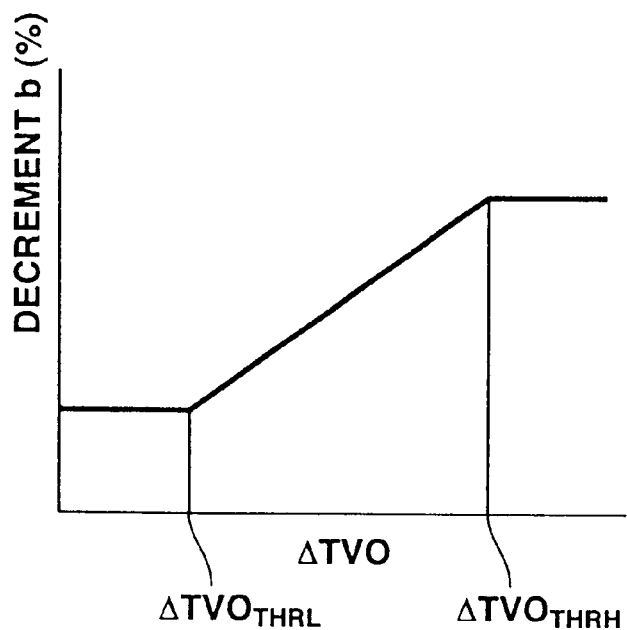
FIG. 19 is a graph depicting the varying of decrement b % with differing throttle rates (ΔTVO) in still another embodiment of the present invention.

Decrement b % may be determined from a look-up table as shown in FIG. 18 or from a look-up table as shown in FIG. 19. With reference to FIG. 18, decrement b % may take varying values with differing values of throttle rate ΔTVO. With reference to FIG. 19, two discrete throttle rate thresholds, namely, a low threshold $\Delta TVO_{THRL}$ and a high threshold $\Delta TVO_{THRH}$, are established. Controller 100 compares throttle rate ΔTVO to at least one of these thresholds $\Delta TVO_{THRL}$ and $\Delta TVO_{THRH}$. If ΔTVO is less than $\Delta TVO_{THRL}$, controller 100 determines the lowest value as decrement b %. If ΔTVO is greater than or equal to $\Delta TVO_{THRH}$, controller 100 determines the highest value as decrement b %. If ΔTVO is not less than $\Delta TVO_{THRL}$ but less than $\Delta TVO_{THRH}$, controller 100 determines varying intermediate values against differing values of ΔTVO.

Figure 20:
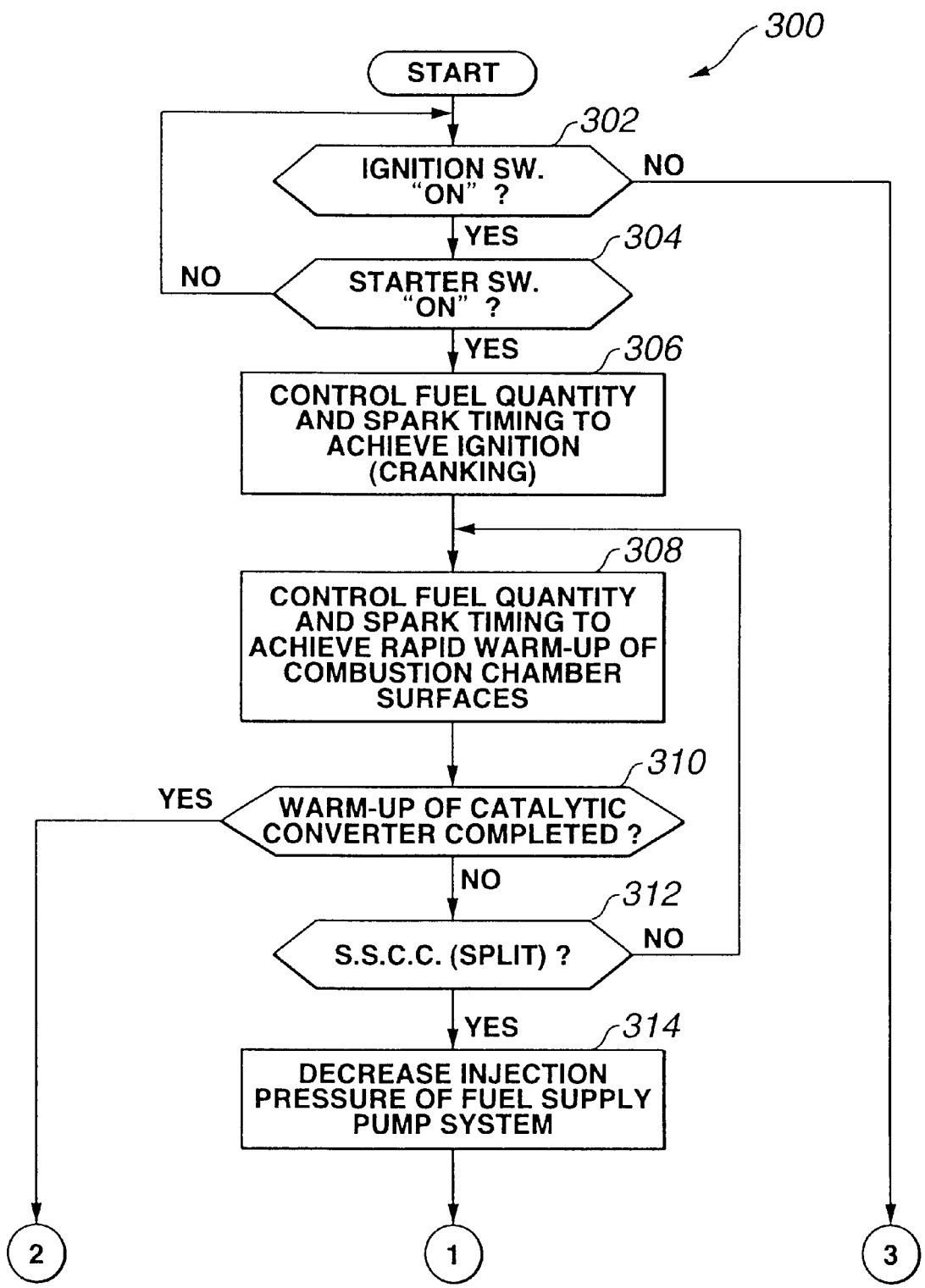
FIGS. 20 and 21 are a block diagram of a cold start routine, implementing the present invention, which cooperates with the spark timing control routines of FIGS. 11 and 12 and the injection control routine of FIG. 13.
Figure 21:
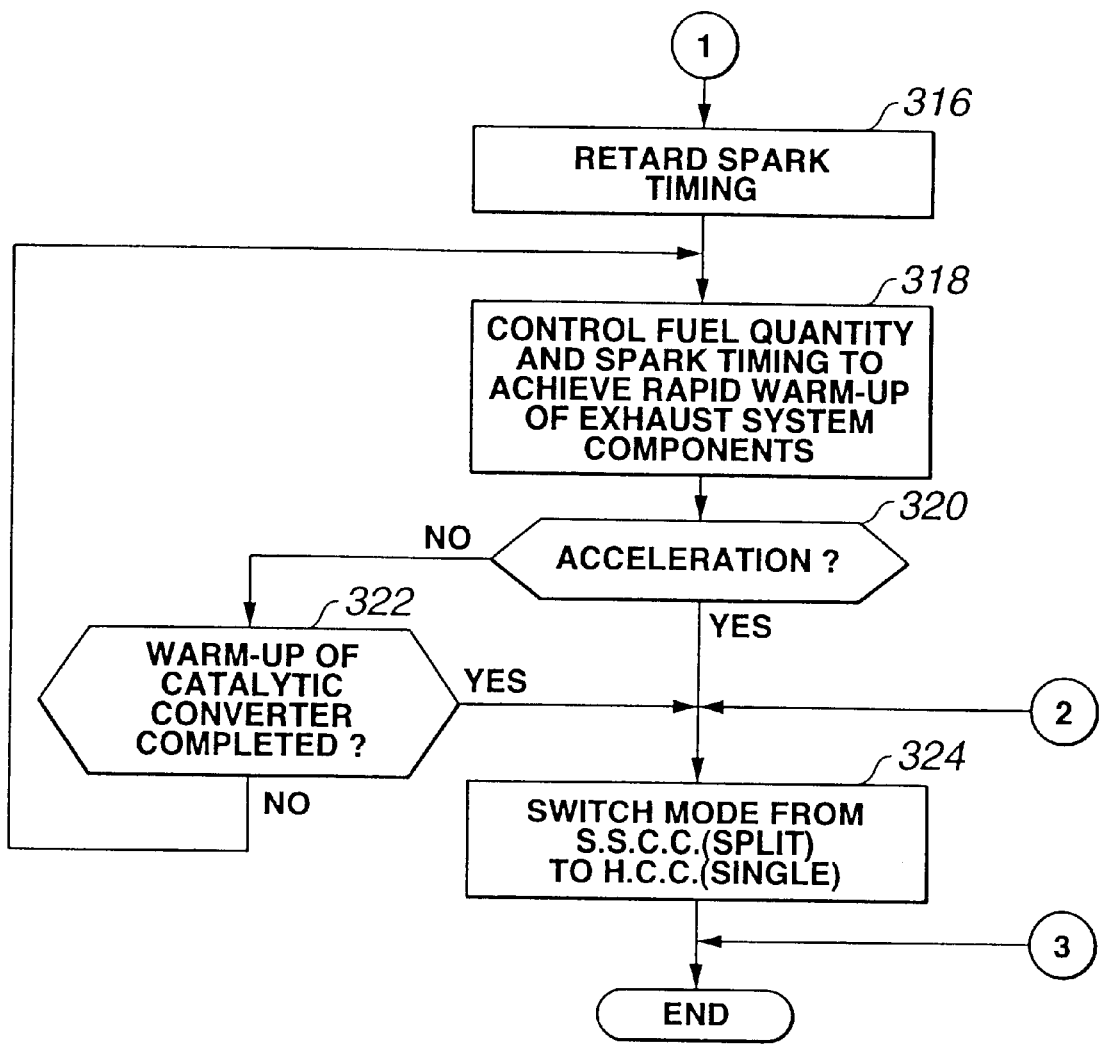

With reference to FIGS. 20 and 21, a cold start routine is generally indicated at 300. FIGS. 20 and 21 show steps executed by controller 100 upon start of the engine to implement the cold start routine 300.

At block 302, controller 100 determines whether or not an ignition switch is at "ON" level. This determination may be made from determination whether or not switch 96 has taken its "ON" position. If this is not the case (NO), the process goes to the end point. If this is the case (YES), the process goes to block 304.

At block 304, controller 100 determines whether or not a starter switch is at "ON" level to determine whether or not cranking of the engine by a starter motor is required. This determination may be made from determination whether or not switch 96 has takes its "START" position. If this is not the case (NO), the process returns to the start point. If this is the case (YES), the process goes to block 306.

At block 306, controller 100 initiates engine-cranking operation. On the first engine cycle, for each cylinder, the quantity of fuel delivered and the spark timing are controlled to achieve combustion in the first engine cycle. This is preferably performed by injecting a quantity of fuel into the combustion chamber, which results in an air/fuel ratio substantially the stoichiometry ($A/F_{STO}$). In order to achieve the stoichiometry, the quantity of fuel actually injected into the combustion chamber by a single injection during intake stroke is greater than the quantity required to achieve the stoichiometry in the gases, in order to account for combustion chamber wall wetting effects. As will be appreciated by those skilled in the art, wall wetting effects are more pronounced when the surfaces of the combustion chamber are cold, thus preventing effective vaporization of the fuel that impacts the surfaces of the combustion chamber. Spark timing in the first engine cycle is empirically determined to provide the greatest probability for combustion of the air/fuel mixture.

At the next block 308, for the subsequent cycles, the quantity of fuel injected by single injection and the spark timing are controlled in a manner to achieve a rapid warm-up of combustion chamber surfaces. This is achieved by injecting a quantity of fuel to achieve an air/fuel mixture that is in a range around the stoichiometry. While a stoichiometry air/fuel ratio is preferable, a quantity of fuel required to achieve a slightly lean air/fuel ratio is injected to account for the quantity of unvaporized fuel on the surfaces of the combustion chamber from the initial engine cycle. The unvaporized fuel will vaporize as the surfaces become warmer. Spark timing at block 308 is advantageously advanced. By moving the spark timing to an earlier point in the engine cycle, an increased amount of energy released from combustion of the air/fuel mixture is used to warm up the surfaces of the combustion chamber. Block 308 is preferably executed until the surfaces of the combustion chamber become warm or until A/F sensor 84 becomes activated. As will be appreciated by those skilled in the art, rapid heating of the combustion chamber surfaces reduces overall tailpipe hydrocarbon (HC) emissions during cold start by allowing more complete combustion of the air/fuel mixture in the combustion chamber.

At block 310, controller 100 determines whether or not warm-up of catalytic converter is completed. This determination may be made from determination whether or not catalyst temperature exceeds an activation temperature. If this is the case, the process goes to block 324. If catalyst temperature is still lower than its activation temperature, the process goes to block 312. It will be understood by those skilled in the art that controller 100 causes the engine to perform H.C.C. (SINGLE) at during cranking at block 306 and the subsequent engine cycles for rapid warm-up of combustion chamber surfaces at block 308.

At block 312, controller 100 determines whether or not predetermined conditions are met for entering S.S.C.C. (SPLIT) mode. The predetermined entering conditions are:

1) The air/fuel sensor 84 has been activated or a predetermined period of time has passed from the complete combustion of air/fuel mixture in the combustion chamber; and
2) The idle switch is turned on.

If this is not the case, the process returns to block 308. If this is the case, the logic in controller 100 switch mode from H.C.C. (SINGLE) to S.S.C.C. (SPLIT), see moment I in FIG. 4. Then, the process goes to blocks 314 and 316 to perform injection pressure control, spark timing control, and command control in the manner described in connection with FIG. 4.

At blocks 314 and 316, the injection pressure and spark timing controls are carried. At block 314, controller 100 causes fuel supply pump system 50 to decrease injection pressure down to target pressure for split injection. Upon the target pressure for split injection being achieved, controller 100 retards spark timing, at block 316, to the target retarded point [D] (see FIG. 10) using the control routine 150 shown in FIG. 11.

At the next block 318, for the subsequent engine cycles until operator torque demand occurs or warm-up of catalyst converter is completed, the quantity of fuel injected and the spark timing are controlled in a manner to achieve rapid warm-up of exhaust system components, including the catalyst material contained in the catalytic converter. This is achieved by S.S.C.C. (SPLIT) in which the quantity of fuel injected is injected during two discrete portions of each engine cycle. The total amount of fuel injected is preferably a quantity that generates the stoichiometry air/fuel ratio. In this embodiment, this is accomplished by feed back control based on the sensor output of A/F sensor 86. Approximately 50% to 90% by weight of the total quantity of fuel is injected at time TITMH (see FIG. 7) during the intake stroke, and the remaining 50% to 10% by weight is injected at time TITMS (see FIG. 7) during the compression stroke. Spark timing at block 318 is retarded to a point as indicated at [D] in FIGS. 10 and 22. As showing in FIGS. 2A and 2B, by injecting the first portion of the total fuel during the intake stroke and the second or remaining portion during the compression stroke, the stratified air/fuel mixture charge is achieved in the combustion chamber as shown in FIG. 2C. The second portion of the total fuel injected during the compression stroke forms a rich mixture portion around the park plug within the surrounding lean mixture portion formed mainly by the first portion of fuel injected during the intake stroke. The proportion Ksp (%) of the first portion injected during the intake stroke to the total fuel is determined so that the rich mixture portion has air/fuel ratio 9 to 13 and the surrounding lean mixture portion has air/fuel ratio 16 to 28. The proportion may be time dependent proportion Ksp(t) as explained in connection with FIG. 13. Preferably, the air/fuel ratio of the rich mixture portion falls in the range 9 to 13 to form a sufficient amount of carbon monoxide (CO) content after combustion of the air/fuel mixture in the combustion chamber, while the air/fuel ratio of the surrounding lean mixture falls in the range 16 to 28 to leave a sufficient amount of oxygen after combustion of the air/fuel mixture in the combustion chamber. The carbon monoxide and oxygen contents serve to achieve an increase in the temperature of the exhaust system components.

Controller 100 monitors operator torque demand as well as catalyst temperature. At block 320, controller 100 determines whether or not there is operator torque demand. This determination may be made from monitoring accelerator rate or throttle rate ΔTVO or throttle position TVO. If this is not the case, the process goes to block 322.

At block 322, controller 100 determines whether or not warm-up of catalytic converter has been completed. If this is not the case, the process returns to block 318. If this is the case, the process goes to block 324.

If, at block 320, controller 100 determines that there is operator torque demand, the process goes to block 324.

At block 324, controller 100 switches mode from S.S.C.C (SPLIT) to H.C.C. (SINGLE), the cold start routine is exited, and controller 100 carries out the transient control from S.S.C.C. (SPLIT) to H.C.C. (SINGLE) along with control routine 180 shown in FIG. 12.

Figure 22:
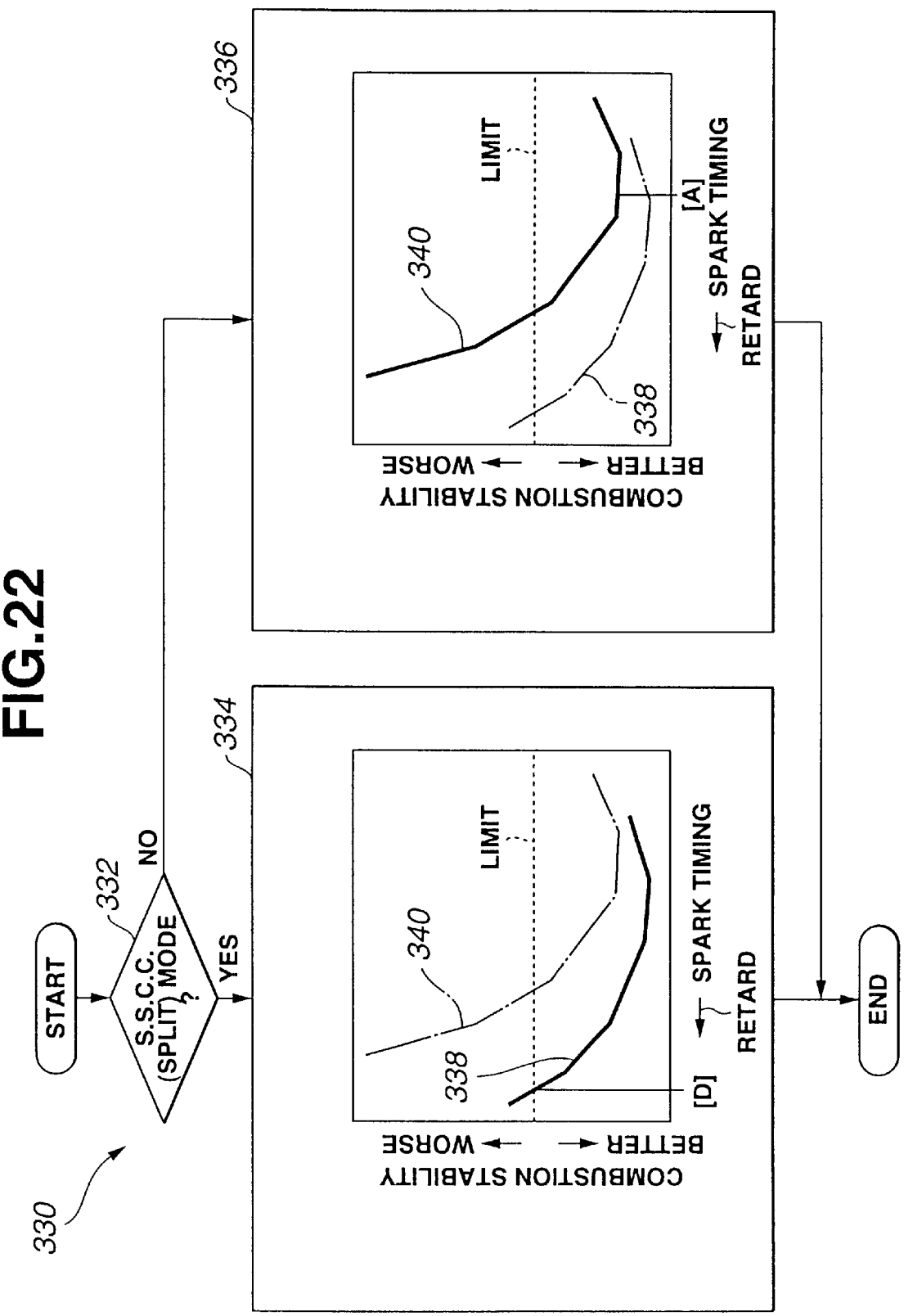
FIG. 22 is a block diagram illustrating a method of determining a desired ignition-timing point during engine operation on S.S.C.C. (SPLIT) and a desired ignition-timing point during engine operation on H.C.C. (SINGLE), respectively.

With reference now to FIG. 22, a method of determining desired ignition timing points for S.S.C.C. (SPLIT) and H.C.C. (SINGLE), respectively, is generally indicated at 330. At block 332, it is determined whether the engine operates in S.S.C.C. (SPLIT) mode. If this is the case, the process goes to block 334. If this is not the case, the process goes to block 336. At block 334, ignition timing point [D] is determined as spark timing for S.S.C.C. (SPLIT). At block 336, ignition timing point [A] is determined as spark timing for H.C.C. (SINGLE). Within each of blocks 334 and 336, the reference numeral 338 indicates a contour line illustrating varying of combustion stability with differing points to ignite stratified stoichiometry air/fuel mixture charge created in S.S.C.C. (SPLIT) mode, while the reference numeral 340 indicates a contour line illustrating the varying of combustion stability with differing points to ignite homogenous stoichiometry air/fuel mixture charge created in H.C.C. (SINGLE) mode. The point [D] is retarded from MBT on the line 338 and located in the neighborhood of the combustion stability limit. The point [A] on the line 340 is MBT on the line 340.

Figure 23:
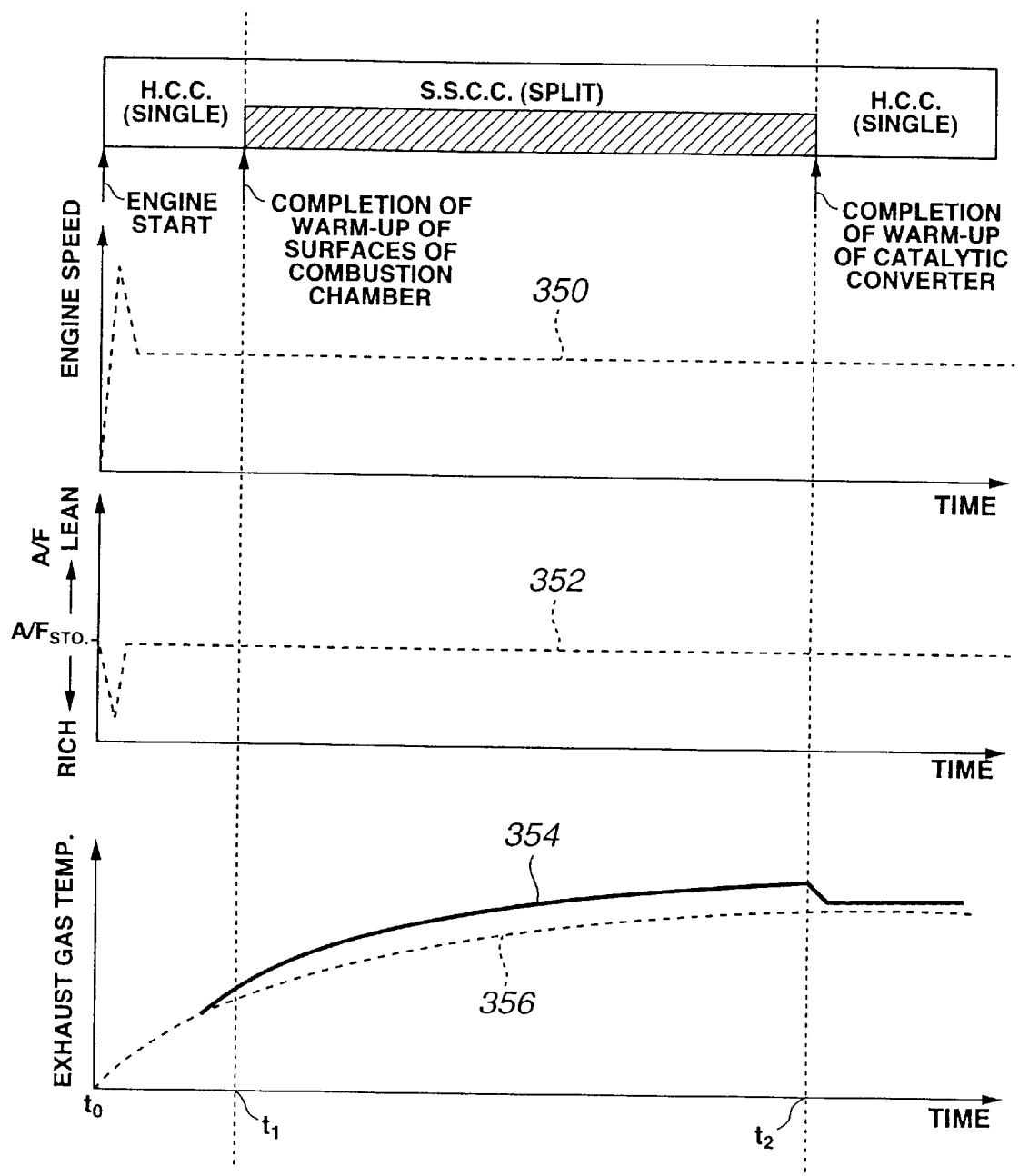
FIGS. 23 and 24 are a timing diagram illustrating the varying of exhaust gas temperature, hydrocarbons (HC), carbon monoxide (CO), and oxygen ($O_2$) during engine cold start by employing S.S.C.C. (SPLIT) until completion of catalyst warm-up when there is no appreciable increase in torque demand, as compared to the varying of the same parameters during engine cold start by employing H.S.C.C. (SINGLE).
Figure 24:
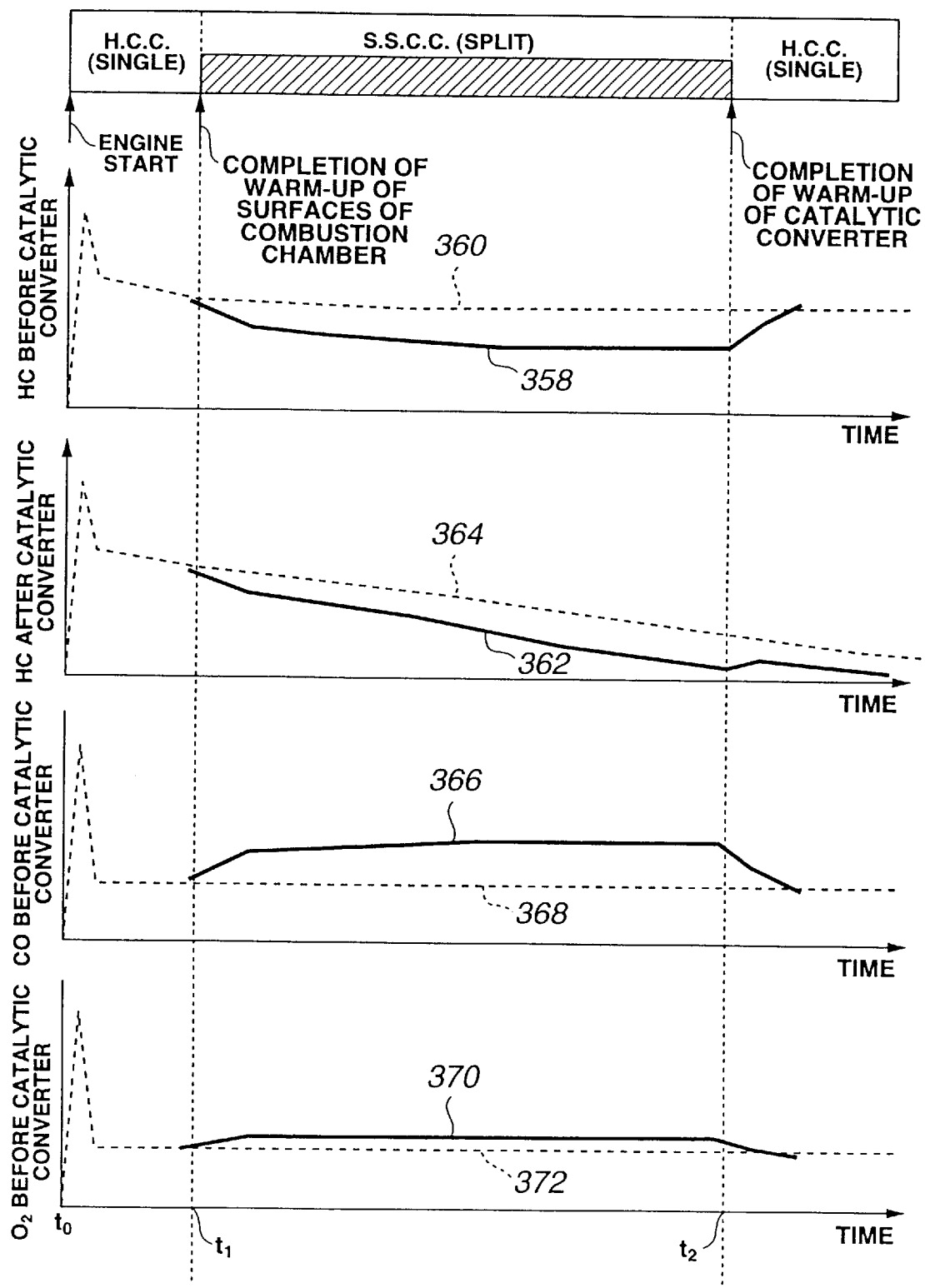

FIGS. 23 and 24 are timing diagram illustrating the operation of cold start routine 300 in FIGS. 20 and 21. At moment $t_0$, ignition switch 96 is turned to start the engine. At moment $t_1$, warm-up of surfaces of combustion chamber is completed for switch, in mode, from H.C.C. (SINGLE) to S.S.C.C. (SPLIT). At moment $t_2$, warm-up of catalytic converter is completed. In FIG. 23, the broken line 350 illustrates engine speed, and the broken line 352 illustrates air/fuel ratio. The fully drawn line 354 in FIG. 23 illustrates exhaust gas temperature due to S.S.C.C. (SPLIT) as compared to exhaust gas temperature, as illustrated by the broken line 356, due to combustion of H.S.C.C. by single injection. In FIG. 24, the fully drawn line 358 illustrates hydrocarbon (HC) before catalytic converter 90 due to S.S.C.C. (SPLIT) as compared to hydrocarbon (HC), as illustrated by the broken line 360, due to H.S.C.C. by single injection. The fully drawn line 362 illustrates hydrocarbon (HC) after catalytic converter 90 due to S.S.C.C. (SPLIT) as compared to hydrocarbon (HC), as indicated by the broken line 364, due to H.S.C.C. by single injection. The fully drawn line 366 illustrates carbon monoxide (CO) before catalytic converter 90 due to S.S.C.C. (SPLIT) as compared to carbon monoxide (CO), as indicated by the broken line 368, due to H.S.C.C. by single injection. The fully drawn line 370 illustrates oxygen ($O_2$) before catalytic converter 90 left after S.S.C.C. (SPLIT) as compared to oxygen ($O_2$), as indicated by the broken line 372, left after H.S.C.C. by single injection.

From the inspection of FIGS. 23 and 24, it will be appreciated by those skilled in the art that S.S.C.C. (SPLIT) reduces tailpipe hydrocarbon emissions and time required to activate catalyst because of increased exhaust gas temperature and increased amounts of carbon monoxide and oxygen before catalyst.

Turning back to FIG. 20, at block 312, completion of warm-up of A/F sensor 84 is needed before entering S.S.C.C. (SPLIT). This condition may be eliminated by using a method of transfer from open loop A/F control to closed loop A/F control as indicated at 380 in FIG. 25.

Figure 25:
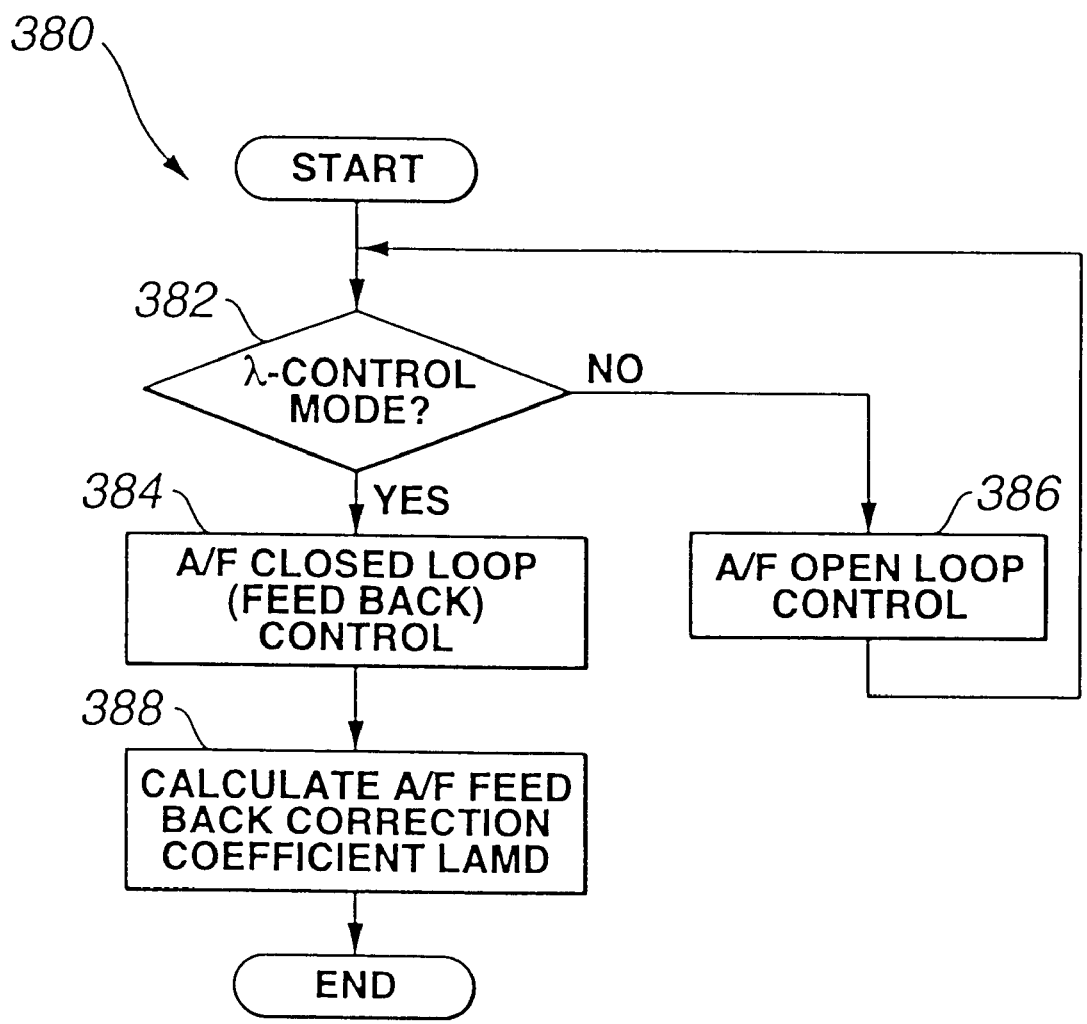
FIG. 25 is a block diagram illustrating a method of transfer from open loop A/F control to closed loop A/F control.

In FIG. 25, at block 382, controller 100 determines whether or not closed loop A/F control based on A/F sensor 84 is possible to carry out. If this is the case, the process goes to block 384. If this is not the case the process goes to block 386.

At block 386, the total quantity of fuel injected is fixed to provide cylinder charge at approximately stoichiometry by performing open loop control. The quantity of fuel is injected into combustion chamber by split injection.

At block 384, A/F closed loop control is performed based on the output of A/F sensor 84. At block 388, feedback correction coefficient LAMD is altered to provide the quantity of fuel injected in split-mode for providing a stoichiometry air/fuel mixture.

Turning back to FIG. 12, the proportion decreases from 100% to 0% at a rate that is determined by decrement b (blocks 186–188). At block 192, the proportion determines the retard amount. In the previously described embodiments, decrement b is determined by throttle rate ΔTVO as shown in FIGS. 17–19. Reduction of the proportion at block 190 may be expressed as follows:

$$(\text{PROPORTION})=(\text{PROPORTION})-b \qquad \text{Eq. 14.}$$

It will be understood that throttle rate ΔTVO only is taken into account in determining the rate of reduction of the proportion, which in turn determines the rate of reduction of the retard amount and thus the spark timing contour line between moments IV and V (see FIGS. 14F and 15F).

Figure 30:
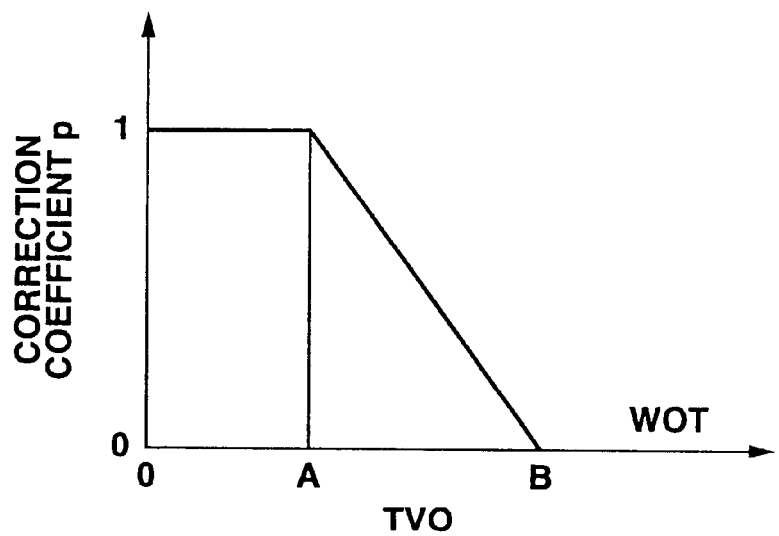
FIG. 30 a graph depicting the varying of correction coefficient p with differing throttle positions (TVO).
Figure 31:
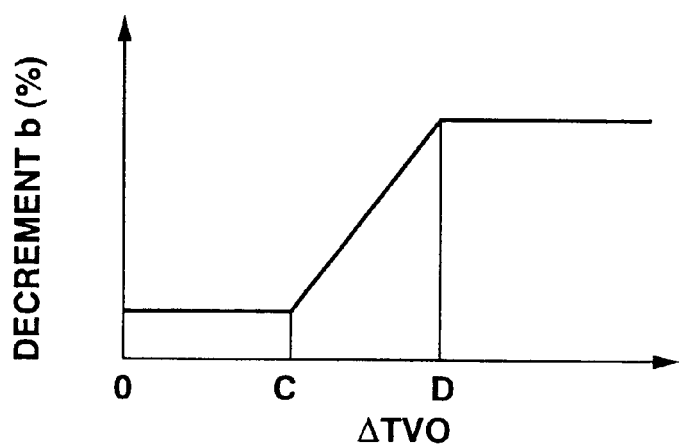
FIG. 31 is a graph depicting the varying of decrement b % with differing throttle rates (ΔTVO).
Figure 32:
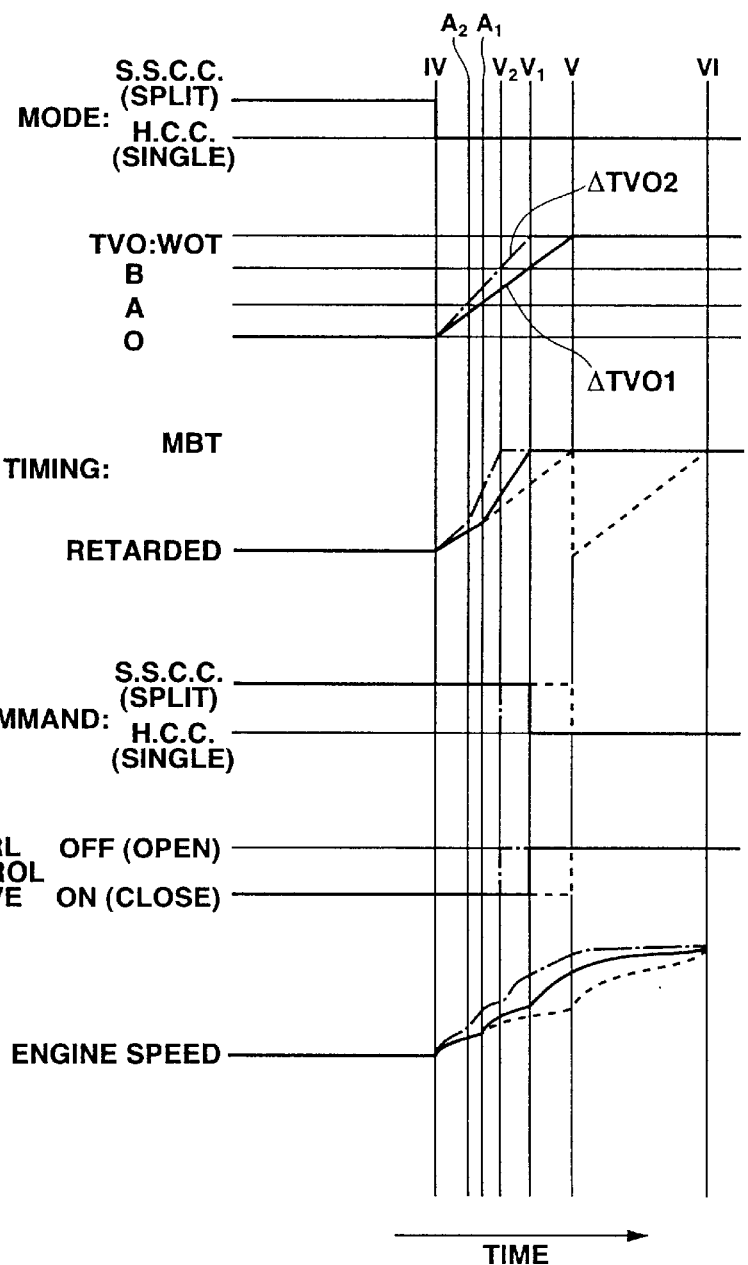
FIGS. 32A to 32F are a timing diagram illustrating the method of the present invention of controlling the engine in response to differing increases in torque demand when the engine operates on S.S.C.C. (SPLIT).

If desired, throttle position TVO may be taken into account as well as throttle rate ΔTVO in determining the rate of reduction of the retard amount. The rate of reduction of the retard amount can be increased as throttle position TVO approaches the wide-open throttle (WOT) position, so that the retard amount decreases quickly to increase the speed at which the spark timing approaches MBT. Referring to FIGS. 30 and 31, this technique will be described.

Correction coefficient p, which varies from 1 to 0, is employed in addition to decrement b. Throttle position TVO is monitored. An appropriate value of correction coefficient p may be found in FIG. 30 against the monitored throttle position TVO. As shown in FIG. 30, correction coefficient p takes 1 when throttle position TVO is not greater than a first predetermined throttle position value A. Correction coefficient p takes one of intermediate values between 1 and 0 when throttle position TVO falls in a range greater than the value A but not greater than a second predetermined throttle position value B. Correction coefficient p decreases from 1 toward 0 as throttle position TVO increases from the first value A toward the second value B. Correction coefficient p takes 0 when throttle position TVO is greater than the second value B.

An appropriate value of decrement b may be found in FIG. 17 or 18 or 19, but, for description purpose only, FIG. 31 is used. The decrement contour line in FIG. 31 is analogous to that in FIG. 19. As shown in FIG. 31, decrement b varies from a minimum value to a maximum value with differing throttle rates ΔTVO. If the monitored throttle rate ΔTVO is not greater than a first predetermined value C, decrement b takes the minimum value. If the throttle rate ΔTVO is greater than the value C, but not greater than a second predetermined value D, the decrement b varies from the minimum value to the maximum value with differing throttle rates ΔTVO in proportional relationship. If the throttle rate ΔTVO is greater than the second predetermined value D, decrement b takes the maximum value.

Using the proportion that is reduced by decrement b and the correction coefficient p, the retard amount can be expressed as:

$$(\text{RETARD AMOUNT})=[MBT-(\text{TARGET RETARDED IGNITION TIMING POINT})]\times(\text{PROPORTION})\times p \qquad \text{Eq. 15.}$$

Referring now to FIGS. 26–29, a preferred embodiment of the present invention employing the above-mentioned equation 15 will be described. This embodiment is substantially the same as the preceding embodiment described in connection mainly with FIGS. 20–21, and 12 except the provision of spark timing control utilizing the retard amount expressed by the equation 15, which spark timing control is carried out only when operator torque demand for acceleration is determined at block 320 (see FIG. 27). As will be later described in connection with FIG. 28, this spark timing control does not involve so-called jump in spark timing in timed with a switch, in command, from S.S.C.C. (SPLIT) to H.C.C. (SINGLE). The difference a, in engine torque, that has been discussed in connection with FIG. 10 remains, but it is not objectionable under circumstances when the vehicle operator demands quick engine response. As will be later described in connection with FIG. 29, a different spark timing control is carried out upon completion of warm-up of catalytic converter is determined at block 310 or 322 (see FIGS. 26 and 27). This spark timing control involves the so-called jump in spark timing in timed with the switch, in mode, from S.S.C.C. (SPLIT) to H.C.C. (SINGLE) and thus it is similar to the spark timing control illustrated in FIG. 12 except that decrement b (%) is kept constant.

Figure 26:
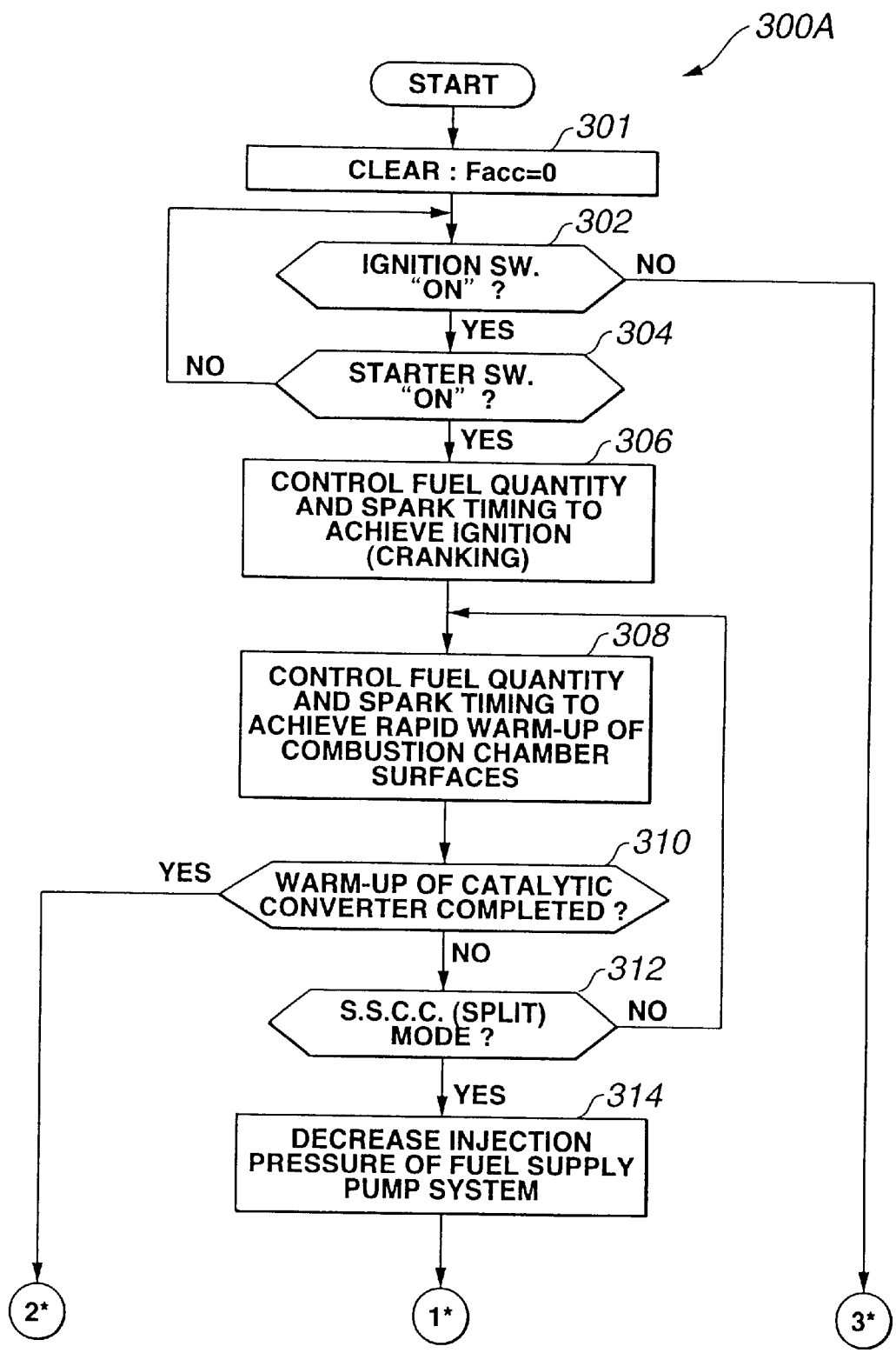
FIGS. 26 and 27 are a block diagram, similar to FIGS. 20 and 21, of a modified cold start routine implementing the present invention.
Figure 27:
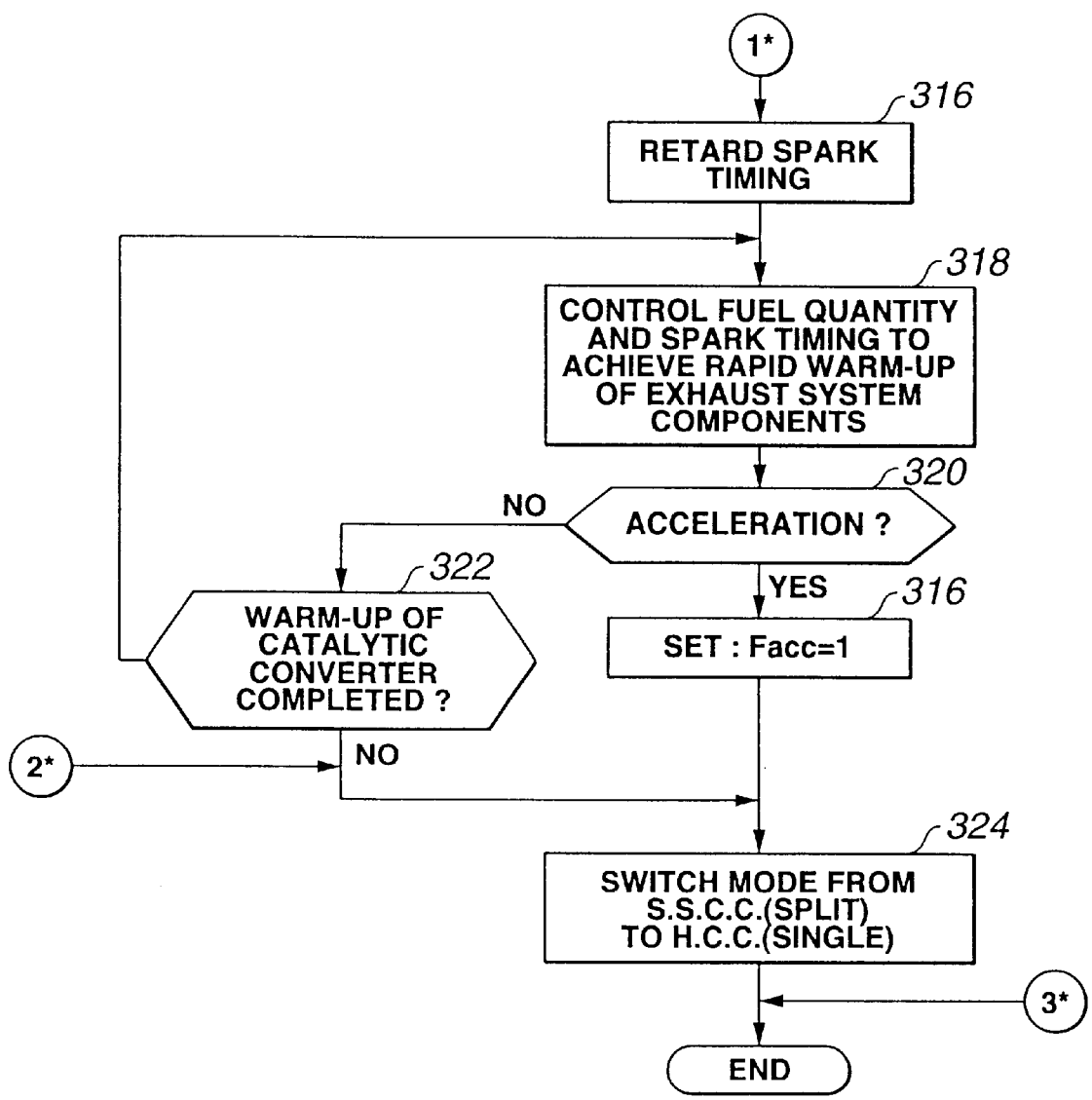

With reference to FIGS. 26 and 27, a modified cold start routine is generally indicated at 300A. This routine 300A is substantially the same as the cold start routine 300 shown in FIGS. 20 and 21 except the provision of an acceleration flag $F_{acc}$, which is cleared at block 301 and set at block 400. Like reference numerals are used to designate like blocks throughout FIGS. 20–21, and 27–28. Detailed description of FIGS. 27 and 28 is hereby omitted for brevity.

In operation, controller 100 clears flag $F_{acc}$ ($F_{acc}$=0) immediately after starting this routine 300A. If, at block 320, controller 100 determines that there is operator torque demand, the process goes to block 400. At block 400, controller 100 sets flag $F_{acc}$ ($F_{acc}$=1). Then, the process goes to block 324. If, at block 322, controller 100 determines that warm-up of catalytic converter is completed, the process goes to block 324, leaving flag $F_{acc}$ cleared ($F_{acc}$=0). At block 324, controller 100 switch mode from S.S.C.C. (SPLIT) to H.C.C. (SING After exiting the routine 300A, controller 100 executes spark timing control routine, generally indicated at 500, shown in FIGS. 28 and 29. In this routine 500, controller 100 determines, at block 502, whether or not switch, in mode, from S.S.C.C. (SPLIT) to H.C.C. (SINGLE) has occurred. If this is the case, the status of flag $F_{acc}$ is checked at block 504.

Figure 29:
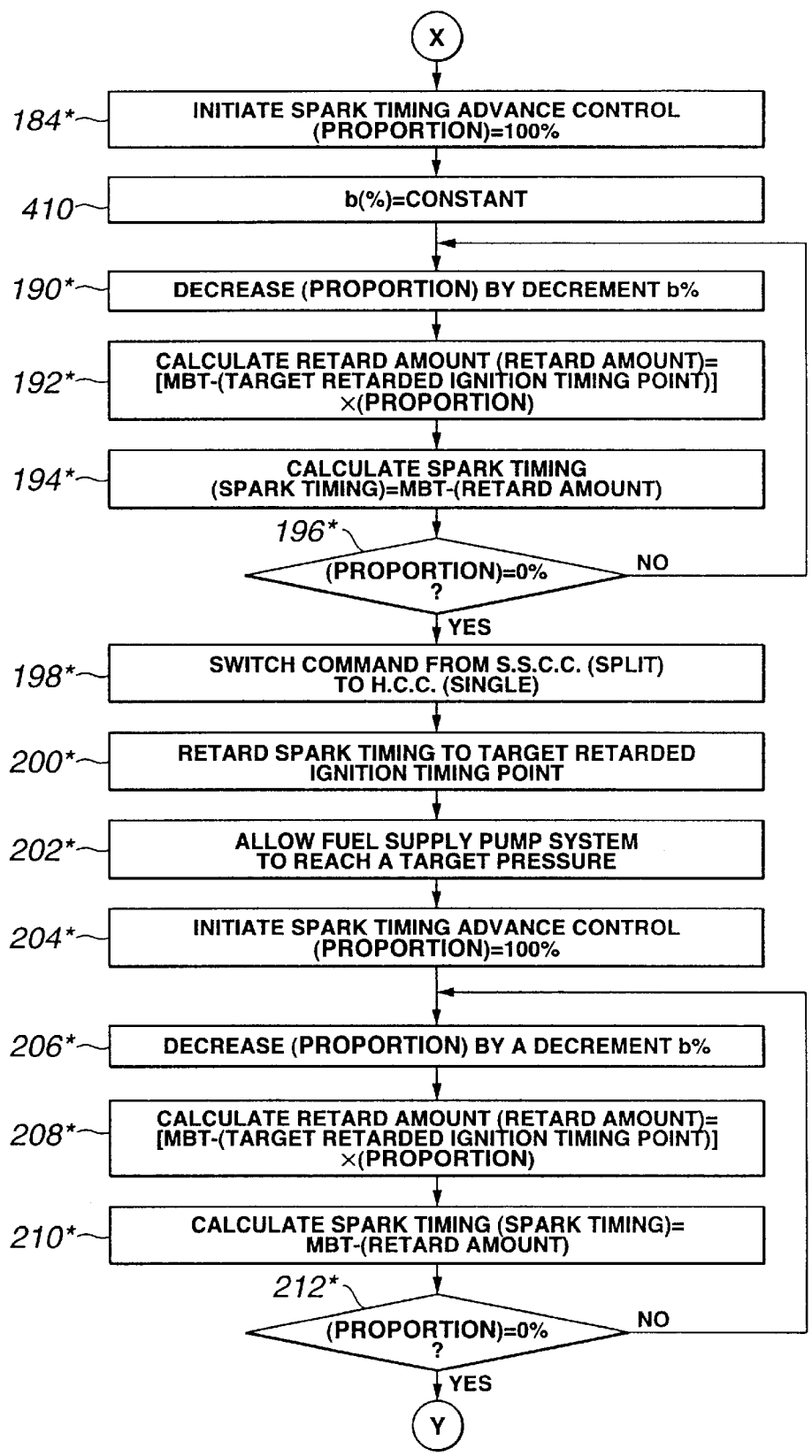

The spark timing control routine 500 is similar to the spark timing control routine 180 shown in FIG. 12 in that a flow of processing shown in FIG. 29, which is executed if $F_{acc}$=0, is substantially the same as the flow of processing shown in FIG. 12. Thus, in FIG. 29, the same reference numerals, with asterisk (*), as used in FIG. 12 are used to indicate like blocks. However, the flow shown in FIG. 29 is different from that shown in FIG. 12 in that, in FIG. 29, decrement b is kept constant at a predetermined values of 1% at block 410, while, in FIG. 12, decrement b is determined based on operator torque demand at blocks 186 and 188.

Figure 28:
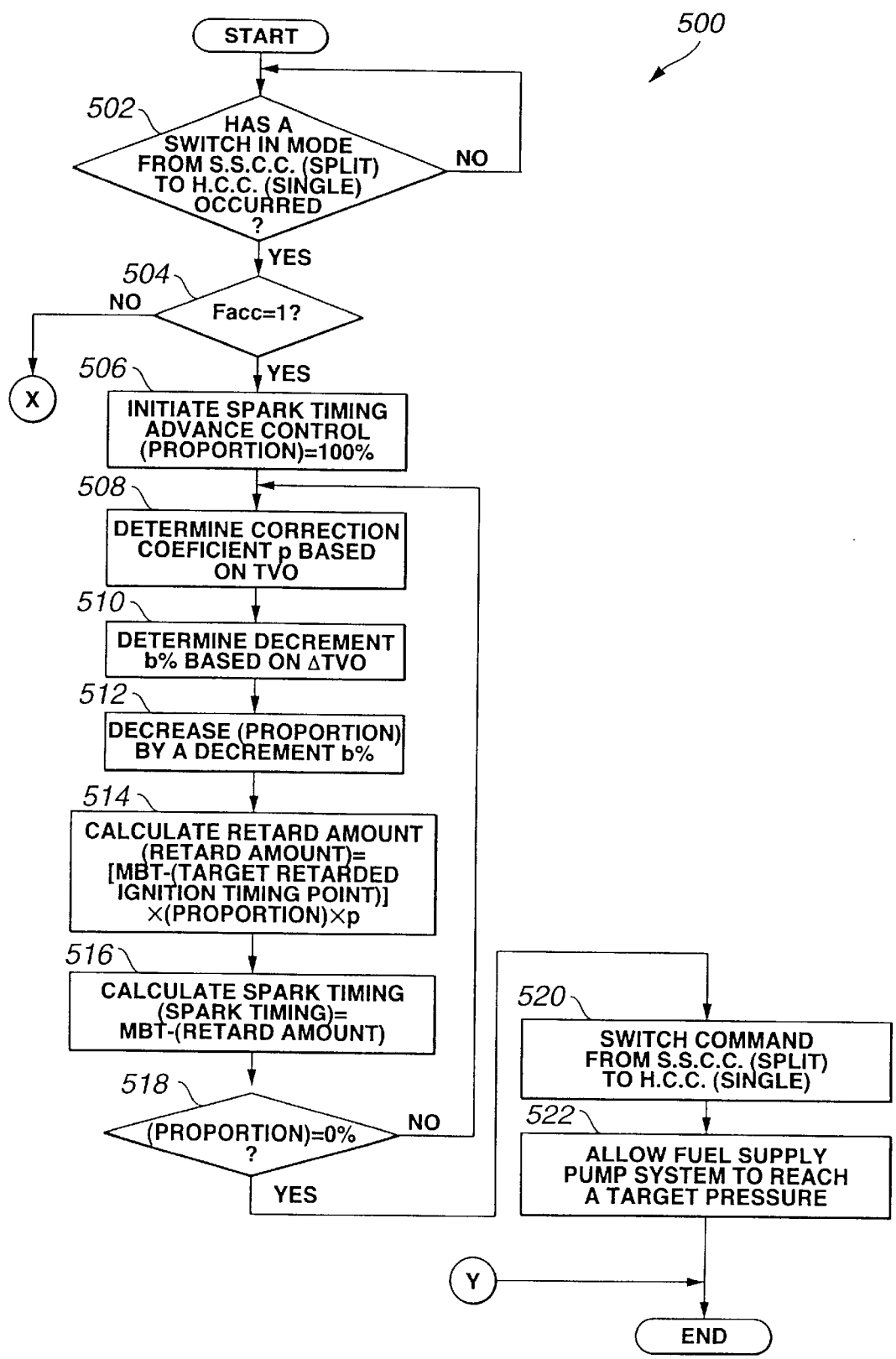
FIGS. 28 and 29 are a block diagram of a spark timing control routine illustrating a modification of the spark timing control routine of FIG. 12.

With reference to FIGS. 28 and 29, if, at block 504, controller 100 determines that flag $F_{acc}$ is cleared, the process goes to block 184* and onwards. The flow of processing in FIG. 29 includes the jump in spark timing, at block 200*, in timed with switch, in command, from S.S.C.C. (SPLIT) to H.C.C. (SINGLE), at block 198*. Besides, decrement b is 1%. Accordingly, a smooth switch from S.S.C.C. (SPLIT) to H.C.C. (SINGLE) is made if completion of warm-up of catalytic converter has switched mode from S.S.C.C. (SPLIT) to H.C.C. (SINGLE).

Referring to FIG. 28, a flow of processing, which is executed if operator torque demand has switched mode from S.S.C.C. (SPLIT) to H.C.C. (SINGLE), will be described.

In this case, the process goes from block 504 to block 506. At block 506, controller 100 sets "proportion" equal to 100% to initiate spark timing advance control. At the next block 508, controller 100 determines correction coefficient p based on the monitored throttle position TVO from FIG. 30. Then, at block 510, controller 100 determines decrement b based on the monitored throttle rate ΔTVO. At the next block 512, controller 100 decreases the proportion by the determined decrement b. The process goes to block 514 where controller 100 calculates "retard amount" by calculating the equation Eq. 15. At block 516, controller 100 calculates spark timing by calculating the equation Eq. 6.

At the next block 518, controller 100 determines whether or not the proportion is equal to 0%. If this is not the case (NO), the process returns to block 508. If this is the case (YES), the process goes to block 520. Controller 100 recognizes that the spark timing has been advanced to the MBT upon determination that the proportion is equal to 0%.

At block 520, controller 100 causes a switch, in command, from S.S.C.C. (SPLIT) to H.C.C. (SINGLE) to occur. In response to the occurrence of switch to H.C.C. (SINGLE) command, controller 100 causes fuel injector 20 to perform single injection by injecting fuel into combustion chamber 18 for each engine cycle during intake stroke. Concurrently with the switch at block 520, controller 100 causes spark timing to jump, at block 200, in retarding direction, controller 100 allows pump system 50 to start increasing injection pressure, at block 522, to reach a target injection pressure for single injection.

With regard to control of SC valve 2, controller 100 switch SC valve 2 from "ON" (close) level to "OFF" (open) level concurrently with the switch at block 520 in FIG. 28 or at block 198* in FIG. 29.

Referring to FIGS. 32A to 32F, the operation of the embodiment, which has been described in connection with FIGS. 26 to 31, will be described.

It is assumed that, upon completion of warm-up of catalytic converter, controller 100 has switched mode from S.S.C.C. (SPLIT) to H.C.C. (SINGLE) at moment IV. In this case, flag $F_{acc}$=0, and decrement b is kept at a constant value at block 410 (FIG. 29). As shown by the illustrated dotted contour line in FIG. 32C, the spark timing is advanced gradually at a constant rate toward MBT. At moment V, spark timing reaches MBT. At this moment V, controller 100 switches command from S.S.C.C. (SPLIT) to H.C.C. (SINGLE) and opens SC valve 2, as shown by the illustrated dotted lines in FIGS. 32D and 32E. With reference again to FIG. 32C, at moment V, the spark timing jumps from MBT to the retarded ignition timing point. Immediately after this jump, the spark timing is advanced gradually at the same constant rate toward MBT as shown by the dotted contour line. At moment VI, the spark timing reaches MBT again, completing switch from S.S.C.C. (SPLIT) to H.C.C. (SINGLE). This spark timing control strategy have proven to be effective in providing smooth switch from S.S.C.C. (SPLIT) to H.C.C. (SINGLE) upon completion of warm-up of catalytic converter.

Next, it is assumed that, at moment IV, upon determination of operator torque demand, controller 100 has switched mode from S.S.C.C. (SPLIT) to H.C.C. (SINGLE) and the throttle position TVO increases to the WOT position at a first throttle rate ΔTVO1 past the two discrete throttle positions A and B. With reference to FIG. 31, the first throttle rate ΔTVO1 is less than C, so that decrement b is kept at the above-mentioned constant value. The coefficient p assumes 1 until throttle position TVO reaches A so that the spark timing is advanced gradually until moment $A_1$ when throttle position TVO reaches A as shown by the fully drawn line in FIG. 32C. As throttle position TVO increases beyond A toward B, the coefficient p decreases toward 0 (zero) so that the spark timing is advanced rapidly as shown by the fully drawn line between moments $A_1$ and $V_1$. At moment $V_1$ when throttle position TVO reaches B, the coefficient p takes 0 (zero) so that the spark timing reaches MBT. At this moment $V_1$, controller 100 switches command from S.S.C.C. (SPLIT) to H.C.C. (SINGLE) and opens SC valve 2, as shown by the fully drawn lines in FIGS. 32D and 32E, completing switch from S.S.C.C. (SPLIT) to H.C.C. (SINGLE).

Further, it is assumed that, at moment IV, upon determination of operator torque demand, controller 100 has switched mode from S.S.C.C. (SPLIT) to H.C.C. (SINGLE) and the throttle position TVO increases to the WOT position at a second throttle rate ΔTVO2 past the two discrete throttle positions A and B. With reference to FIG. 31, the second throttle rate ΔTVO2 is greater than C, so that decrement b is kept at a value that is greater than the above-mentioned constant value. The coefficient p assumes 1 until throttle position TVO reaches A so that the spark timing is advanced at an increased rate until moment $A_2$ when throttle position TVO reaches A as shown by the one-dot chain line in FIG. 32C. As throttle position TVO increases beyond A toward B, the coefficient p decreases toward 0 (zero) so that the spark timing is advanced rapidly as shown by the fully drawn line between moments $A_2$ and $V_2$. At moment $V_2$ when throttle position TVO reaches B, the coefficient p takes 0 (zero) so that the spark timing reaches MBT. At this moment $V_2$, controller 100 switches command from S.S.C.C. (SPLIT) to H.C.C. (SINGLE) and opens SC valve 2, as shown by the one-dot chain lines in FIGS. 32D and 32E, completing switch from S.S.C.C. (SPLIT) to H.C.C. (SINGLE).

In the embodiment, the jump in spark timing and the subsequent advance control to MBT has been eliminated after switch, in command, from S.S.C.C. (SPLIT) to H.C.C. (SINGLE) upon operator torque demand, achieving completion of the switch to H.C.C. (SINGLE) at an early timing.

Besides, in the embodiment, the delay between switch, in mode, to switch, in command, has been shortened upon operator torque demand. Further, the delay is shortened further with increasing of throttle rate ΔTVO.

In the embodiment, the switch to H.C.C. (SINGLE) is completed upon achieving the throttle position B. If it is desired to complete the switch to H.C.C. (SINGLE) well before throttle position B is reached, decrement b may take a value large enough to bring the proportion into zero upon rapid operator torque demand for rapid acceleration.

In the embodiment, the proportion is decreased by decrement b over unit time of 10 milliseconds, at block 512, by calculating the equation 14. The proportion may be decreased by calculating the equation as follows:

$$(\text{PROPORTION}) = (\text{PROPORTION}) - b/p \qquad \text{Eq. 16.}$$

Using this equation 16, the proportion decreases quicker than it does using the equation 14, thus advancing the spark timing to MBT quicker.

Figure 33:
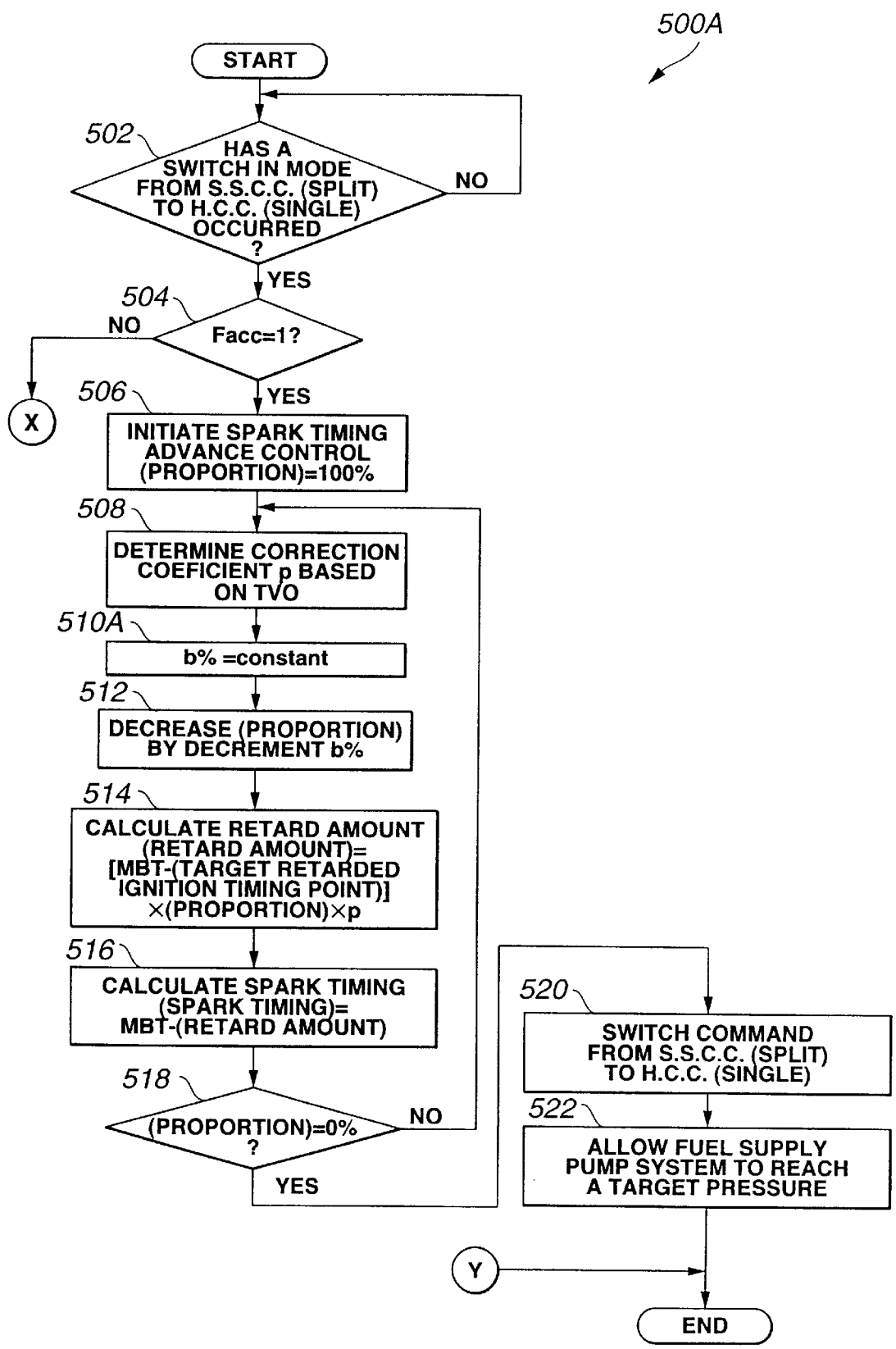
FIG. 33 is a block diagram showing only a modified portion of the spark timing control routine shown in FIGS. 28 and 29.

FIG. 33 illustrates a portion of a spark timing control routine generally indicated at 500A according to one embodiment. The illustrated portion corresponds to the portion shown in FIG. 28 of the spark timing control routine 500. The spark timing control routine 500A is substantially the same as the spark timing control routine 500 shown in FIGS. 28 and 29 except the provision of new block 510A instead of the block 510. At block 510A, the decrement b is kept constant so that the spark timing can be advanced at a rate corrected by the correction coefficient p, which may be found in FIG. 30 against throttle position TVO.

Figure 34:
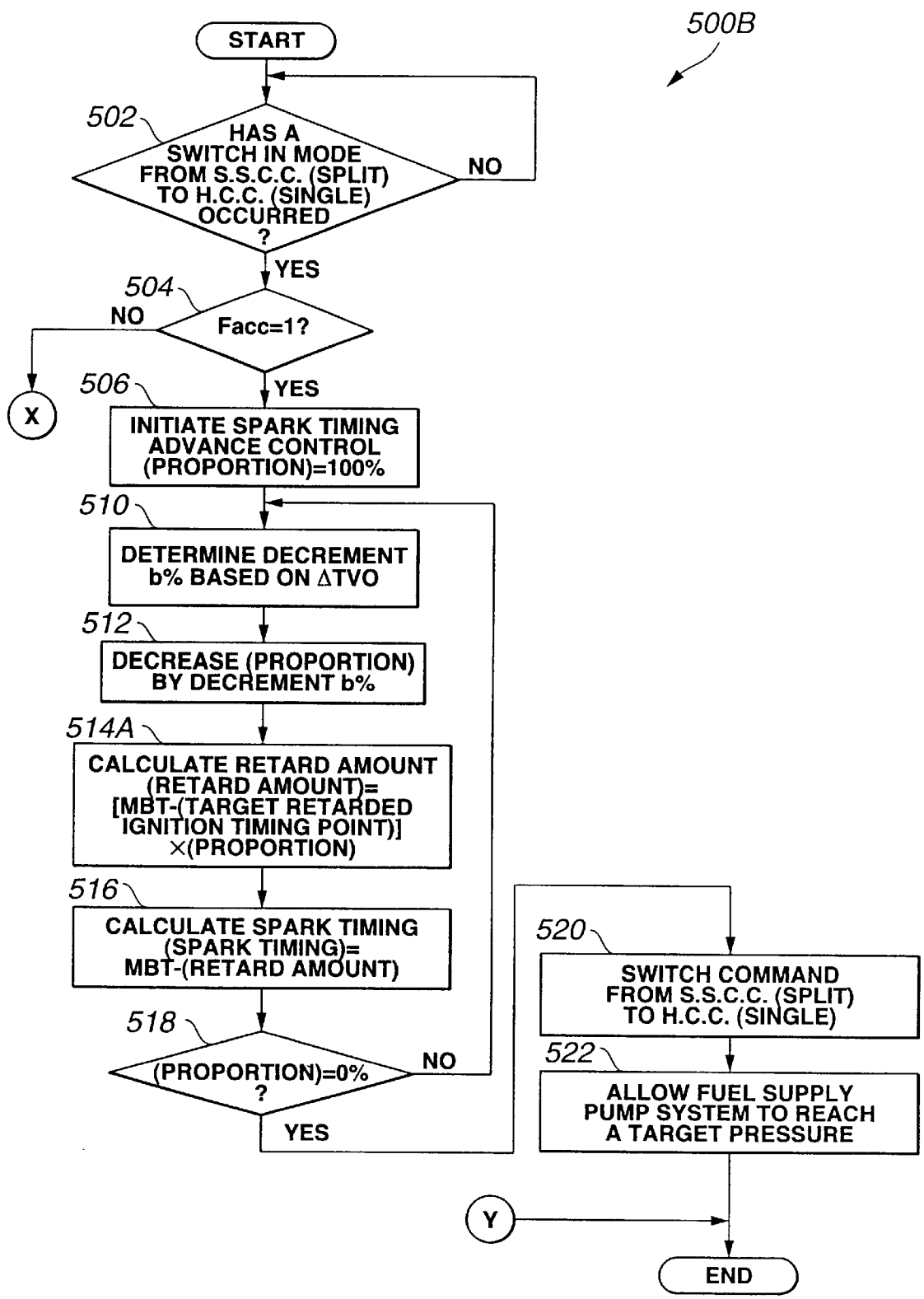
FIG. 34 is a block diagram showing only a modified portion of the spark timing control routine shown in FIGS. 28 and 29.

FIG. 34 illustrates a portion of a spark timing control routine generally indicated at 500B according to another embodiment. The illustrated portion corresponds to the portion shown in FIG. 28 of the spark timing control routine 500. The spark timing control routine 500B is substantially the same as the spark timing control routine 500 shown in FIGS. 28 and 29. However, in the control routine 500B, there is no block corresponding to the block 508 of the control routine 500, and a new block 514A is provided instead of the block 514 of the control routine 500. At block 514A, the retard amount is calculated using the equation 7, so that the spark timing can be advanced at a rate determined by decrement b, which may be found in FIG. 31 against throttle rate ΔTVO.

In the preceding embodiments, operator torque demand is expressed through the accelerator pedal 5. To meet such operator torque demand, throttle position TVO is sensed as a parameter indicative of accelerator position. Instead of sensing throttle position, accelerator position may be sensed.

The various jobs shown in FIGS. 12, 20–21, 26–27, 28–29, 33, and 34 are preferable implemented in program instructions stored in computer readable storage media 104, which are executed by microprocessor 102 of controller 100.

It is to be understood that the specific mechanisms and techniques that have been described are merely illustrative of one application of the principles of the present invention. Although the preferred embodiments are applicable to a spark ignited gasoline engine, the principles of the present invention may also be used in spark ignited engines utilizing alternative liquid fuels.

While the present invention has been particularly described, in conjunction with preferred implementations and embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. P2000-321809, filed Oct. 20, 2000, and No. P2000-387847, filed Dec. 20, 2000, the disclosure of each of which is hereby incorporated by reference in its entirety.

What is claimed is:

1. A method for enhanced response to operator torque demand in a spark ignited internal combustion engine, which has fuel injectors positioned to inject fuel directly into combustion chambers of the engine, the method comprising:
   operating the engine on stratified stoichiometry charge combustion (S.S.C.C.), during a predetermined engine operation, by performing a split injection for each engine cycle, and controlling spark timing according to a first ignition timing point;
   varying a period of time, which is required for advancing spark timing from the first ignition timing point to a second ignition timing point during switch from S.S.C.C. to H.C.C., with differing degrees of the operator torque demand; and
   operating the engine on H.C.C. by performing a single injection for each engine cycle after elapse of said period of time.

2. The method as claimed in claim 1, further comprising:
   controlling injection pressure according to a first injection pressure during operating the engine on S.S.C.C. until the elapse of the period of time;
   allowing an increase of the injection pressure from the first injection pressure toward a second injection pressure upon elapse of the period of time; and
   controlling the injection pressure according to the second injection pressure during operating the engine on H.C.C. after the elapse of the period of time.

3. The method as claimed in claim 1, wherein the process of varying the period of time with differing degrees of operator torque demand includes shortening the period of time with increasing degrees of operator torque demand.

4. The method as claimed in claim 1, wherein the engine has a throttle, and the engine throttle rate is used as a parameter indicative of degree of operator torque demand, and wherein the process of varying the period of time with differing degrees of operator torque demand is such that the period of time is shortened as the throttle rate is increased.

5. The method as claimed in claim 2, further comprising:
   causing spark timing to jump in a retarding direction from the second ignition timing point to a third ignition timing point to start operating the engine on H.C.C. by performing single injection and controlling spark timing according to the third ignition timing point; and
   advancing spark timing from the third ignition timing point to a fourth ignition timing point that is optimal for H.C.C. during operating the engine on H.C.C. by performing single injection.

6. The method as claimed in claim 1, wherein the engine has exhaust system components including a catalytic converter, and wherein, during the predetermined engine operation, the engine is operated on S.S.C.C. by performing split injection and controlling spark timing according to the first ignition timing point for rapid warm-up of the exhaust system components.

7. The method as claimed in claim 1, wherein the split injection is performed by injecting fuel for each engine cycle during intake stroke and injecting fuel during compression stroke of the same engine cycle.

8. The method as claimed in claim 1, wherein the engine includes exhaust system components including an air/fuel sensor, wherein activation of the air/fuel sensor is one of predetermined entering conditions to initiate operating the engine on S.S.C.C. by performing split injection, and feedback control is carried out based on the output of the air/fuel sensor to maintain the charge in each combustion chamber at the stoichiometry during operating the engine on S.S.C.C.

9. The method as claimed in claim 1, wherein there is provided an accelerator, through which operator torque demand may be expressed, and wherein the process of varying the period of time with differing degrees of operator torque demand includes varying rate of advancing spark timing with a parameter indicative of the accelerator position.

10. The method as claimed in claim 1, wherein there is provided an accelerator, through which operator torque demand may be expressed, and wherein the process of varying the period of time with differing degrees of operator torque demand includes varying rate of advancing spark timing with a parameter indicative of the accelerator rate.

11. The method as claimed in claim 1, wherein there is provided an accelerator, through which operator torque demand may be expressed, and wherein the process of varying the period of time with differing degrees of operator torque demand includes varying rate of advancing spark timing with a parameter indicative of the accelerator position and a parameter indicative of the accelerator rate.

12. The method as claimed in claim 9, wherein the process of varying the rate of advancing spark timing is such that the rate of advancing spark timing is increased as the accelerator position indicative parameter is increased.

13. The method as claimed in claim 12, wherein the process of varying the rate of advancing spark timing is such that spark timing reaches the second ignition timing point when the accelerator position indicative parameter exceeds a predetermined value.

14. The method as claimed in claim 10, wherein the process of varying the rate of advancing spark timing is such that the rate of advancing spark timing is increased as the accelerator rate indicative parameter is increased.

15. The method as claimed in claim 1, wherein there is provided a swirl control valve, which, when closed, causes intake air to generate swirl within each combustion chamber, and when opened, causes intake air to generate tumble flow within each combustion chamber, and wherein the swirl control valve is opened upon elapse of the period of time during switch from S.S.C.C. to H.C.C.

16. The method as claimed in claim 1, wherein the split injection during operating the engine on S.S.C.C. is performed by injecting fuel for each engine cycle during intake stroke and injecting fuel during compression stroke of the same engine cycle, and the total quantity of fuel injected for each engine cycle and a proportion of quantity of fuel injected during compression stroke of each engine cycle to the total quantity of fuel are controlled such that, within a cylinder charge in each combustion chamber, a relatively rich air/fuel mixture portion is locally created around a spark plug within the surrounding relatively lean air/fuel mixture under a condition that the overall air/fuel ratio of the cylinder charge is kept within a limited window around the stoichiometry.

17. The method as claimed in claim 9, wherein the engine is provided with a throttle, and wherein the accelerator position indicative parameter is the throttle position.

18. A method for enhanced response to operator torque demand in a spark ignited internal combustion engine, which has fuel injectors positioned to inject fuel directly into combustion chambers of the engine, and a catalytic converter in an exhaust system thereof, the method comprising:
   for engine cycles after ignition at engine start, controlling the quantity of fuel injected to each combustion chamber, and the spark timing to rapidly increase the temperature of the catalytic converter by injecting a first quantity of fuel for each engine cycle during intake stroke and injecting a second quantity of fuel in the same engine cycle during the compression stroke to create a stratified stoichiometry charge wherein a relatively rich ignitable air/fuel mixture portion is located within the surrounding relatively lean air/fuel mixture portion to achieve an air/fuel ratio substantially equal to or marginally richer than a stoichiometric air/fuel ratio, and controlling spark timing according to a first ignition timing point that is retarded from a second ignition timing point;
   for a subsequent number of engine cycles after the catalytic converter has been activated, controlling the quantity of fuel injected to each combustion chamber, and the spark timing by injecting a first quantity of fuel for each engine cycle during intake stroke and injecting a second quantity of fuel in the same engine cycle during the compression stroke to create the stratified stoichiometric charge, and gradually advancing the spark timing in each combustion chamber from the first ignition timing point toward the second ignition timing point;
   for a subsequent number of engine cycles after the spark timing has reached the second ignition timing point, controlling the quantity of fuel injected to each combustion chamber and the spark timing by injecting the quantity of fuel for each engine cycle during the intake stroke to create a homogeneous charge, and causing the spark timing to jump from the second ignition timing point in a retarded direction to a third ignition timing point and then advancing the spark timing gradually from the third ignition timing point to a predetermined optimal ignition timing point;
   for a subsequent number of engine cycles after occurrence of operator torque demand before activation of the catalytic converter, controlling the quantity of fuel injected to each combustion chamber, and the spark timing by injecting a first quantity of fuel for each engine cycle during intake stroke and injecting a second quantity of fuel in the same engine cycle during the compression stroke to create the stratified stoichiometric charge, and advancing the spark timing in each combustion chamber from the first ignition timing point toward the predetermined optimal ignition timing point in a manner determined in response to the operator torque demand; and for a subsequent number of engine cycles after the spark timing has reached the predetermined optimal ignition timing point, controlling the quantity of fuel injected to each combustion chamber and the spark timing by injecting the quantity of fuel for each engine cycle during the intake stroke to create the homogeneous charge, and controlling the spark timing according to the predetermined optimal ignition timing point.

19. A system for enhanced response to operator torque demand in a spark ignited internal combustion engine, which has fuel injectors positioned to inject fuel directly into combustion chambers of the engine, the system comprising:

a spark ignited internal combustion engine having fuel injectors positioned to inject fuel directly into combustion chambers of the engine;

an engine controller; and a computer readable storage media having data stored thereon representing instructions executable by the engine controller to operate the engine on stratified stoichiometry charge combustion (S.S.C.C.), during a predetermined engine operation, by performing a split injection for each engine cycle, and controlling spark timing according to a first ignition timing point;

vary a period of time, which is required for advancing spark timing from the first ignition timing point to a second ignition timing point during switch from S.S.C.C. to H.C.C., with differing degrees of the operator torque demand; and operate the engine on H.C.C. by performing a single injection for each engine cycle after elapse of said period of time.

20. A system for enhanced response to operator torque demand in a spark ignited internal combustion engine, which has fuel injectors positioned to inject fuel directly into combustion chambers of the engine, the system comprising:

a spark ignited internal combustion engine having fuel injectors positioned to inject fuel directly into combustion chambers of the engine;

means for sensing a parameter indicative of operator torque demand; and engine controller means for operating the engine on stratified stoichiometry charge combustion (S.S.C.C.), during a predetermined engine operation, by performing a split injection for each engine cycle, and controlling spark timing according to a first ignition timing point;

varying a period of time, which is required for advancing spark timing from the first ignition timing point to a second ignition timing point during switch from S.S.C.C. to H.C.C., in response to the operator torque demand indicative parameter; and operating the engine on H.C.C. by performing a single injection for each engine cycle after elapse of said period of time.

* * * * *